(12) United States Patent
Wang et al.

(10) Patent No.: US 12,732,780 B2
(45) Date of Patent: Sep. 8, 2026

(54) METHODS FOR POWER EFFICIENT BROADCASTING IN WLAN

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Li Hsiang Sun, San Diego, CA (US); Joseph Levy, Merrick, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 467 days.

(21) Appl. No.: 18/032,383

(22) PCT Filed: Oct. 19, 2021

(86) PCT No.: PCT/US2021/055597

§ 371 (c)(1),
(2) Date: Apr. 18, 2023

(87) PCT Pub. No.: WO2022/086952

PCT Pub. Date: Apr. 28, 2022

(65) Prior Publication Data

US 2023/0388753 A1 Nov. 30, 2023

Related U.S. Application Data

(60) Provisional application No. 63/181,752, filed on Apr. 29, 2021, provisional application No. 63/093,588, filed on Oct. 19, 2020.

(51) Int. Cl.
*H04W 4/06* (2009.01)
*H04W 72/12* (2023.01)

(52) U.S. Cl.
CPC ............. *H04W 4/06* (2013.01); *H04W 72/12* (2013.01)

(58) Field of Classification Search
CPC .................... H04W 4/06; H04W 72/12; H04L 2012/6448; H04L 61/6022; H04L 29/12839; H04L 2101/622
See application file for complete search history.

(56) References Cited

U.S. PATENT DOCUMENTS

2011/0141963 A1* 6/2011 Lim ........................ H04L 51/58 370/312
2018/0352397 A1 12/2018 Cariou et al.
(Continued)

FOREIGN PATENT DOCUMENTS

WO 2021/158950 8/2021

OTHER PUBLICATIONS

Das et al., "AP assisted ML operation," IEEE 802.11-19/1930r3 (Nov. 2019).

(Continued)

*Primary Examiner* — Un C Cho
*Assistant Examiner* — Theodore Im
(74) *Attorney, Agent, or Firm* — Volpe Koenig

(57) ABSTRACT

Systems, methods, and devices for broadcast service negotiation and non-simultaneous transmit-receive (STR) channel blindness recovery are provided herein. Some methods performed by a Wireless Transmit/Receive Unit (WTRU), may comprise operating over a first link; operating over a second link; receiving a frame including a Network Allocation Vector (NAV) setting associated with the second link, the NAV setting indicating a time duration; and sending a transmission over the first link, wherein a duration of the transmission over the first link is shorter than or equal to the time duration indicated by the NAV setting. The frame (Continued)

including the NAV setting indicates that the time duration may not be extended or modified. The method may further comprise sending, by the WTRU, an indication that it the WTRU is capable of performing a multi-link restricted transmission. The WTRU may enter a sleep mode on the first link after sending the transmission over the first link.

12 Claims, 16 Drawing Sheets

(56) References Cited

U.S. PATENT DOCUMENTS

| | | | | |
|---|---|---|---|---|
| 2020/0008095 | A1* | 1/2020 | Patil | H04W 12/03 |
| 2020/0084696 | A1* | 3/2020 | McCann | H04W 48/10 |
| 2020/0120454 | A1* | 4/2020 | Gundur | H04L 65/1016 |
| 2020/0374870 | A1* | 11/2020 | Guo | H04W 72/12 |
| 2020/0389869 | A1* | 12/2020 | Patil | H04B 17/318 |
| 2021/0360396 | A1* | 11/2021 | Hirano | H04W 12/041 |
| 2022/0132421 | A1* | 4/2022 | Wang | H04W 52/0229 |
| 2022/0295333 | A1* | 9/2022 | Lopez | H04W 52/0229 |

OTHER PUBLICATIONS

Gan et al., "AP assisted Non-STR behavior," IEEE 802.11-20/0613-01-00be (Apr. 2020).
Jang et al., "Method for Handling Constrained MLD," IEEE 802.11-20/0414r4 (Mar. 2020).
Lu et al., "AP Assisted Multi-link Synchronous Transmission," IEEE 802.11-21/0361r0 (Mar. 2021).
Ansley et al., "Speculative Edits to 802.11bc SFD," IEEE 802.11-20/0677r2 (Jun. 2020).
Das et al., "Blindness issue for non-STR operations-followup," IEEE 802.11-20/1009r4 (Jul. 3, 2020).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D0.1 (Sep. 2020).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.2 (Sep. 2021).
Draft IEEE Standard for Information technology—Telecommunications and information exchange between systems Local and metropolitan area networks—Specific requirements; Amendment 4: Enhanced Broadcast Service, IEEE 802.11bc/D0.2 (Oct. 2020).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhanced Broadcast Service, IEEE 802.11bc/D1.04 (Aug. 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D8.0 (Oct. 2020).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE 802.11ax-2021 (Feb. 2021).
Patil et al., "MLO: Need for sync PPDUs," IEEE 802.11-20-0275r2 (Mar. 15, 2020).
Wang et al., "Discussion on NSTR Blindness Recovery," IEEE 802.11-21/248r0 (Feb. 2021).
Wang et al., "MLME for eBCS Negotiation," IEEE 802.11-20/1524r1 (Oct. 2020).
Wang et al., "MLME for eBCS Termination Notice," IEEE 802.11-20/1525r1 (Oct. 2020).
Wang et al., "Spec Text for Power Efficient eBCS," IEEE 802.11-20/886r2 (Jun. 2020).

* cited by examiner

| Name | Type | Valid range | Description |
|---|---|---|---|
| eBCSTerminationInformationSet | eBCS Termination Information Set field | An eBCS Termination Notice frame format | Specifies the termination information for one or more eBCSs. |

| Name | Type | Valid range | Description |
| --- | --- | --- | --- |
| eBCSTerminationInformation Set | eBCS Termination Information Set field | An eBCS Termination Notice frame format. | The contents of the eBCS Termination Information Set field in the received eBCS Termination Notice frame. |

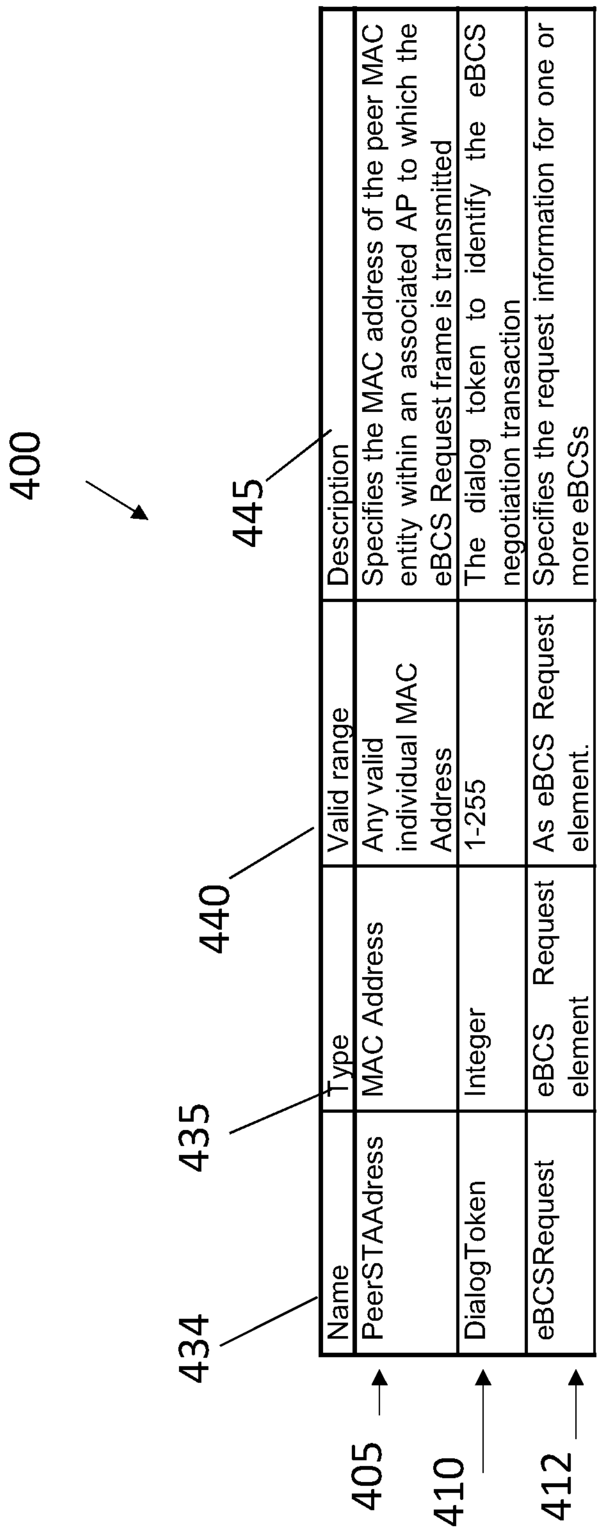

| Name | Type | Valid range | Description |
|---|---|---|---|
| PeerSTAAdress | MAC Address | Any valid individual MAC Address | Specifies the MAC address of the peer MAC entity within an associated AP to which the eBCS Request frame is transmitted |
| DialogToken | Integer | 1-255 | The dialog token to identify the eBCS negotiation transaction |
| eBCSRequest | eBCS Request element | As eBCS Request element. | Specifies the request information for one or more eBCSs |

FIG. 4

| Name | Type | Valid range | Description |
| --- | --- | --- | --- |
| DialogToken | Integer | 1-255 | The dialog token to identify the eBCS negotiation transaction |
| eBCSResponse | eBCS Response element | An eBCS Response element | The contents of the eBCS Response element in the received eBCS Response frame. |

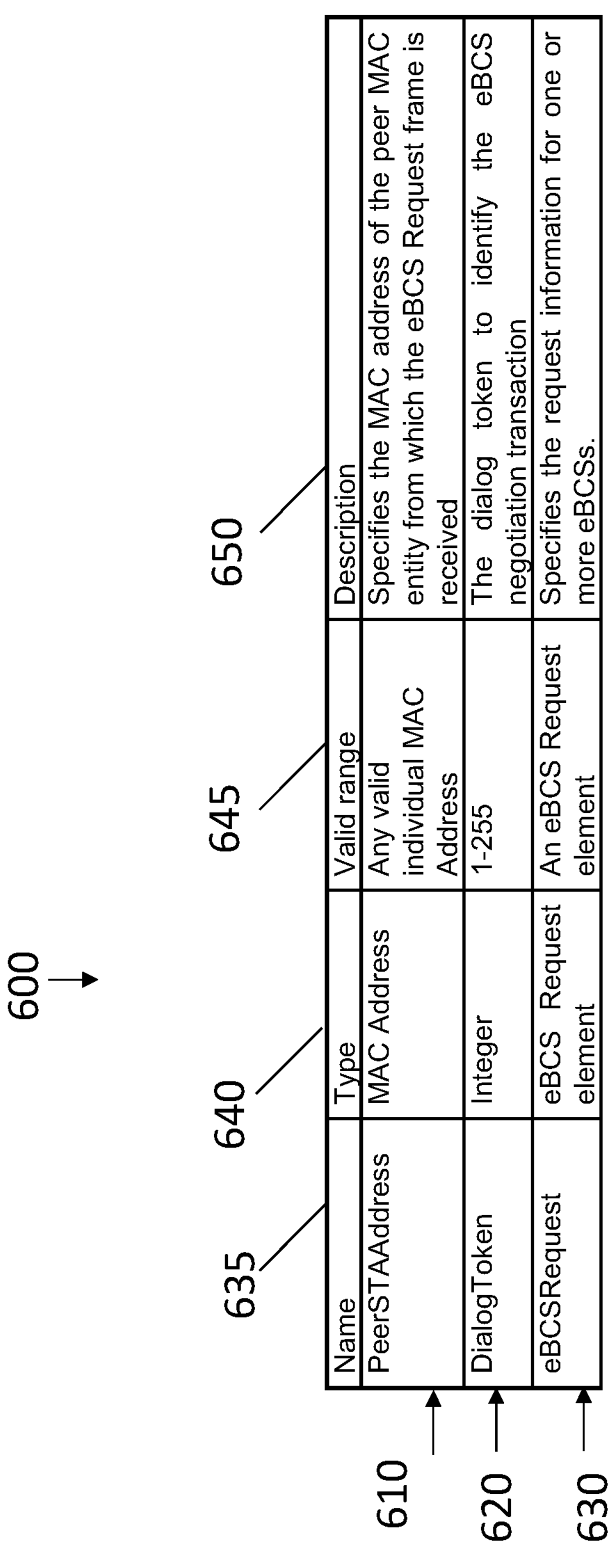

| Name | Type | Valid range | Description |
|---|---|---|---|
| PeerSTAAddress | MAC Address | Any valid individual MAC Address | Specifies the MAC address of the peer MAC entity from which the eBCS Request frame is received |
| DialogToken | Integer | 1-255 | The dialog token to identify the eBCS negotiation transaction |
| eBCSRequest | eBCS Request element | An eBCS Request element | Specifies the request information for one or more eBCSs. |

FIG. 6

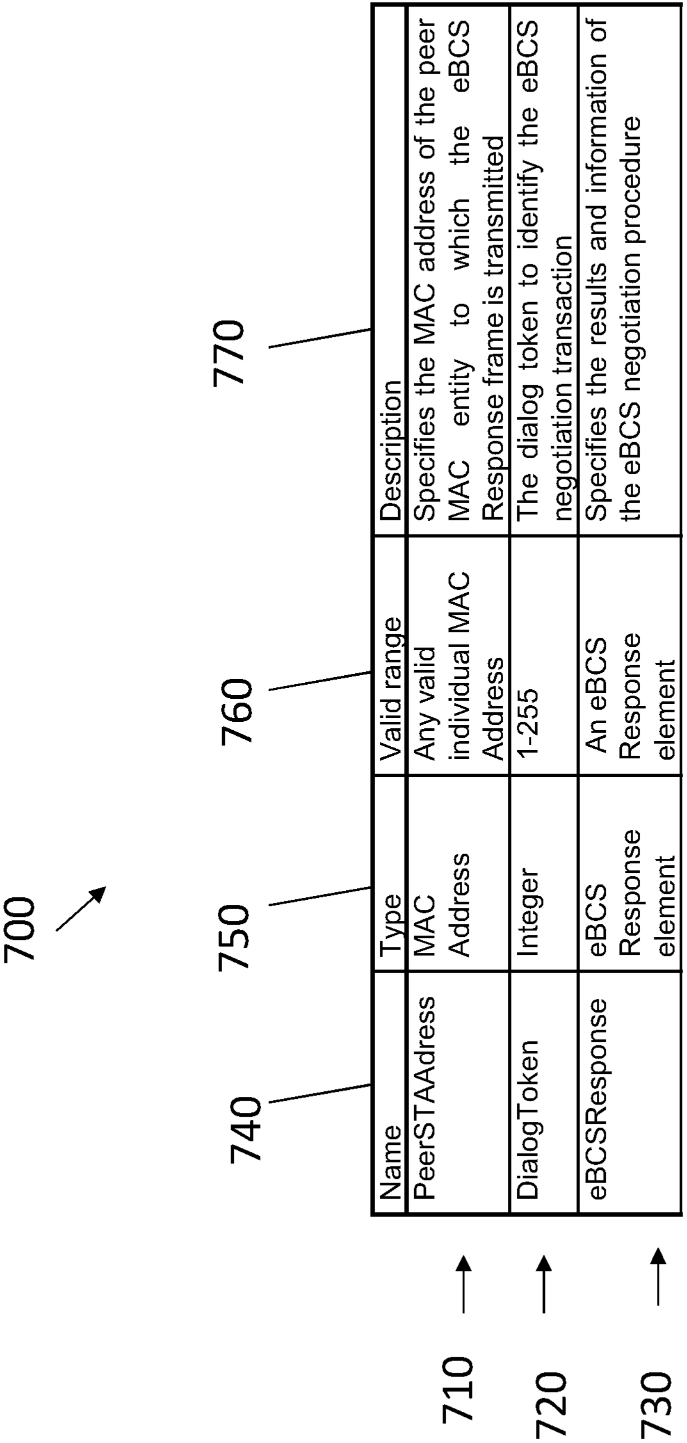

| Name | Type | Valid range | Description |
|---|---|---|---|
| PeerSTAAdress | MAC Address | Any valid individual MAC Address | Specifies the MAC address of the peer MAC entity to which the eBCS Response frame is transmitted |
| DialogToken | Integer | 1-255 | The dialog token to identify the eBCS negotiation transaction |
| eBCSResponse | eBCS Response element | An eBCS Response element | Specifies the results and information of the eBCS negotiation procedure |

FIG. 7

900
AP SME
AP MAC
STA MAC
STA SME
902
MLME-EBCSTERMINATION .request Primitive
99
904
Termination Notice Frame
920
932
MLME-EBCSTERMINATION .Indication Primitive
930

950
STA SME
STA MAC
AP MAC
AP SME
956
MLME-EBCS .request Primitive
955
957
EBCS Request Frame
960
958
965
MLME-EBCS.Indication Primitive
MLME-EBCS.response Primitive
959
980
EBCS Response Frame
981
975
970
982
MLME-EBCS .confirm Primitive

METHODS FOR POWER EFFICIENT BROADCASTING IN WLAN

CROSS-REFERENCE TO RELATED APPLICATIONS

This application is the U.S. National Stage, under 35 U.S.C. § 371, of International Application No. PCT/US2021/055597 filed Oct. 19, 2021, which claims the benefit of U.S. Provisional Application No. 63/093,588 filed Oct. 19, 2020; U.S. Provisional Application No. 63/181,752, filed Apr. 29, 2021, the contents of which are incorporated herein by reference.

SUMMARY

Systems, methods, and devices for broadcast service negotiation and non-simultaneous transmit-receive (STR) channel blindness recovery are provided herein. Some methods performed by a Wireless Transmit/Receive Unit (WTRU), may comprise operating over a first link; operating over a second link; receiving a frame including a Network Allocation Vector (NAV) setting associated with the second link, the NAV setting indicating a time duration; and sending a transmission over the first link, wherein a duration of the transmission over the first link is shorter than or equal to the time duration indicated by the NAV setting. The frame including the NAV setting indicates that the time duration may not be extended or modified. The method may further comprise sending, by the WTRU, an indication that it the WTRU is capable of performing a multi-link restricted transmission. The WTRU may enter a sleep mode on the first link after sending the transmission over the first link.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 4 provides a description of the parameters of a MLME-EBCS.request primitive;

FIG. 6 provides a description of the parameters of a MLME-EBCS.indication primitive;

FIG. 7 provides a description of the parameters of a MLME-EBCS.response primitive.

DETAILED DESCRIPTION

Figure 1A:
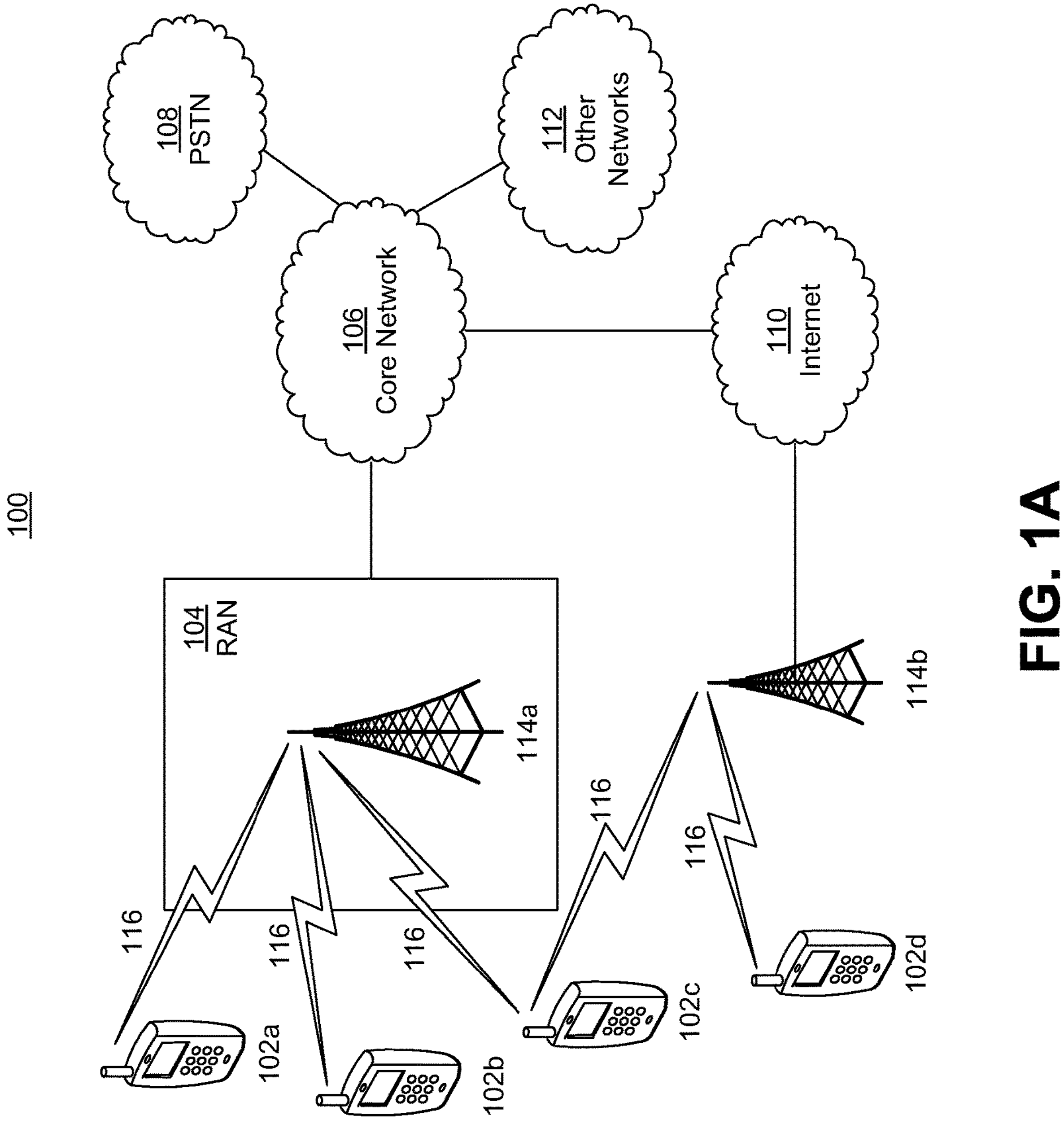
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*,

102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
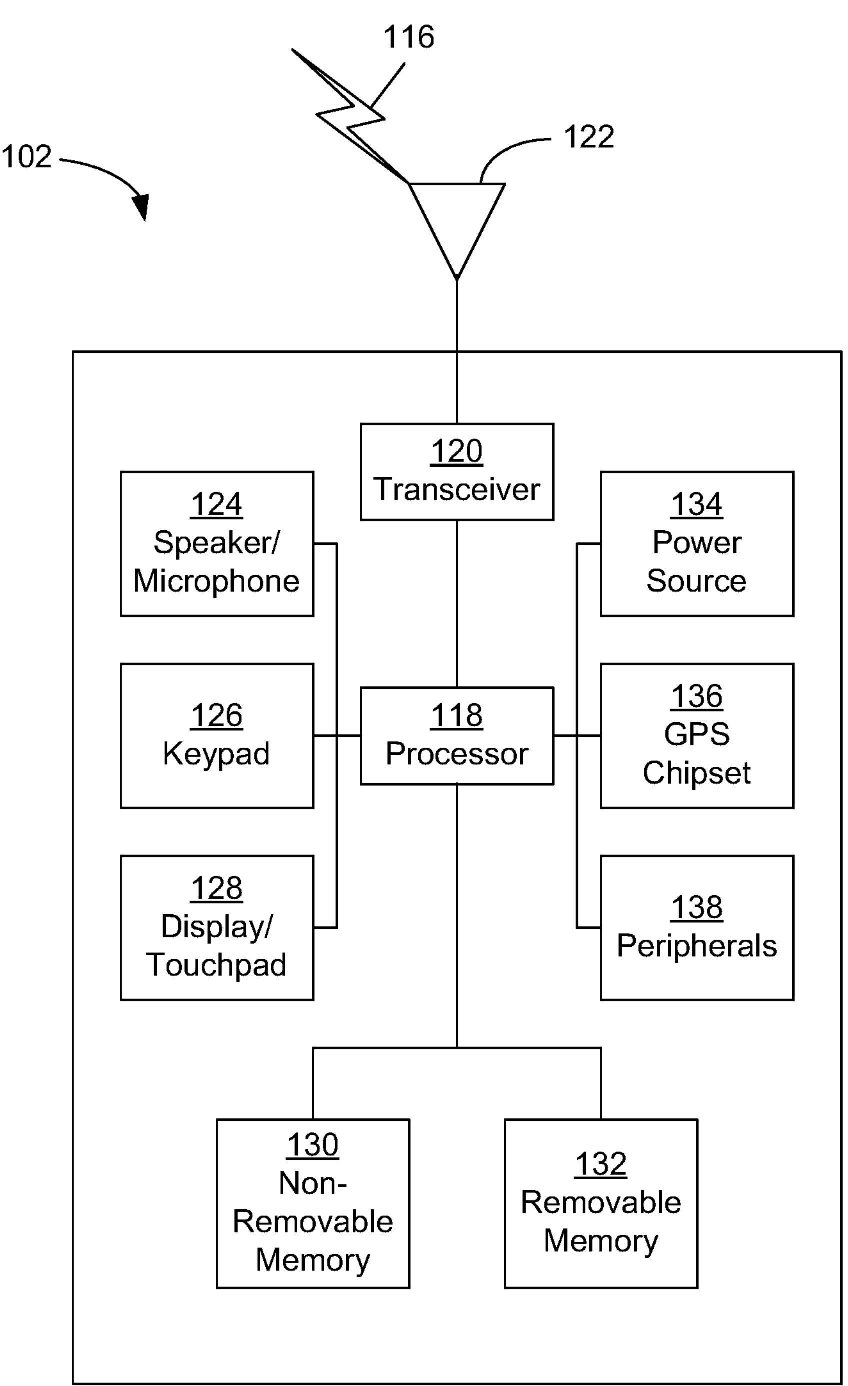
FIG. 1B is a system diagram illustrating an example wireless transmit/receive unit (WTRU) that may be used within the communications system illustrated in FIG. 1A according to an embodiment.
Figure 1C:
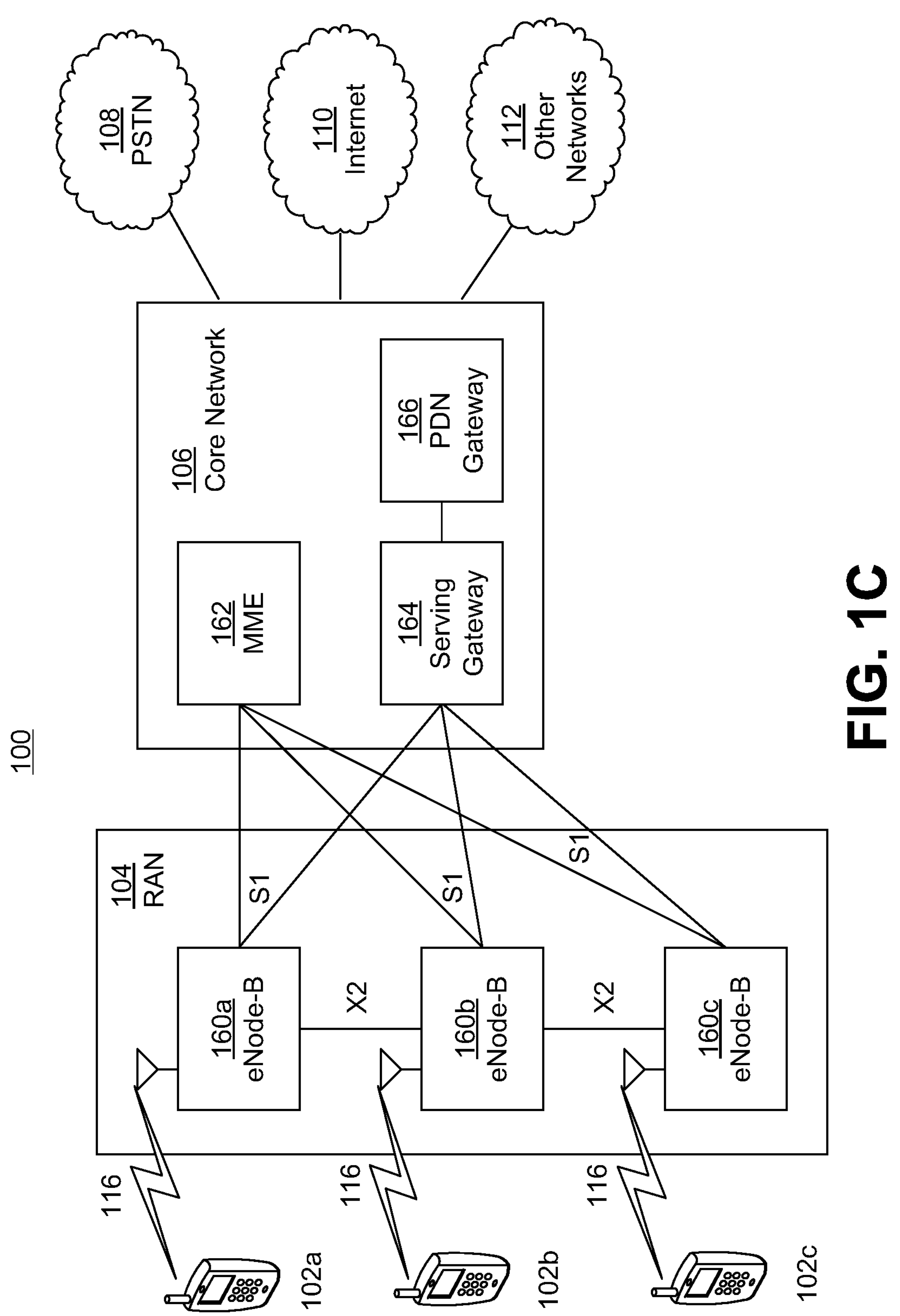
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figures 9, 10:
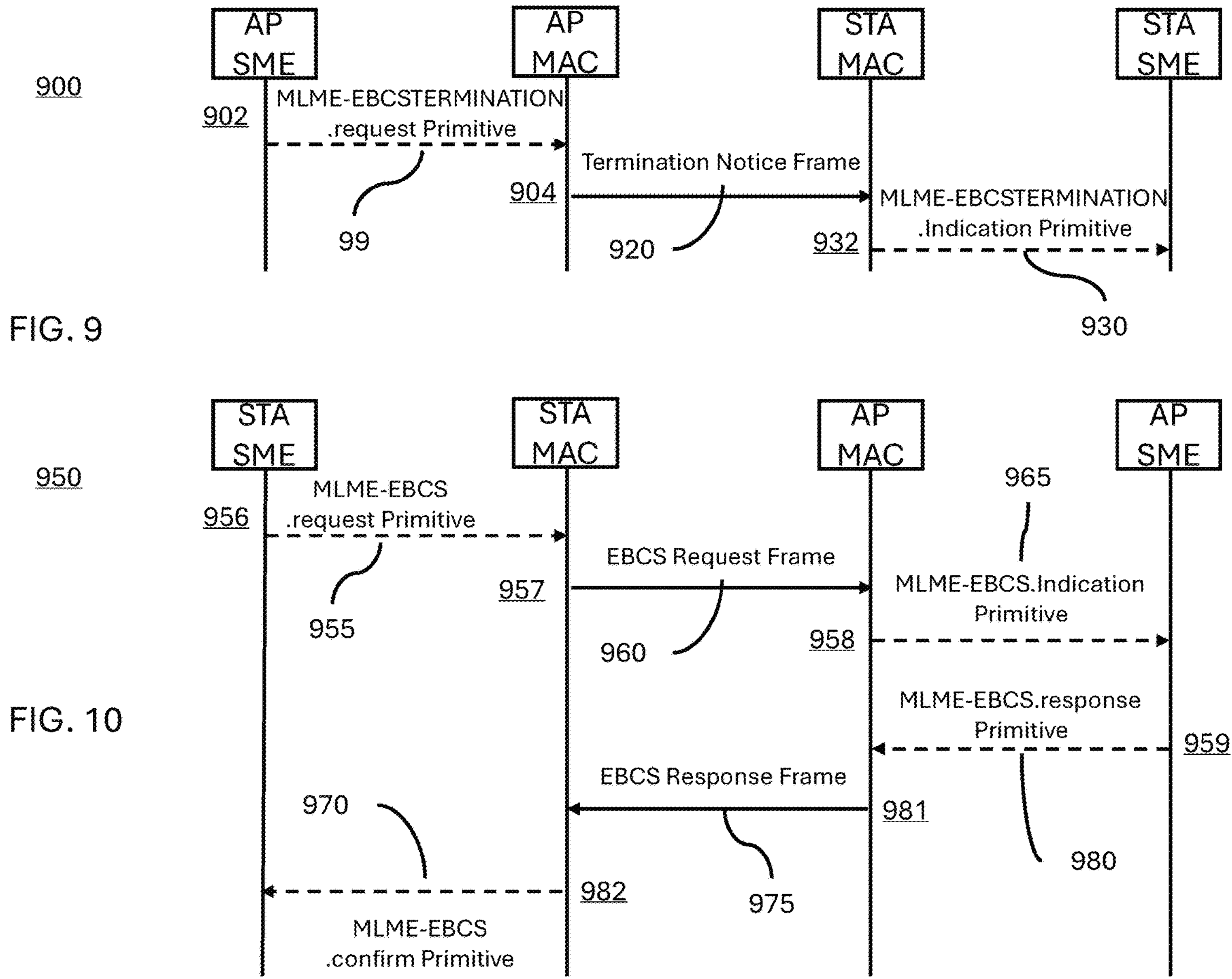
FIG. 9 is a signal flow diagram illustrating a sequence of signals according to embodiments disclosed herein.
FIG. 10 is a signal flow diagram illustrating a sequence of signals according to embodiments disclosed herein.

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication is referred to as an "ad-hoc" mode of communication.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

Sub 1 GHz modes of operation are supported by 802.11af [3], and 802.11ah [4]. For these specifications the channel operating bandwidths, and carriers, are reduced relative to those used in 802.11n [1], and 802.11ac [2]. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g. MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel; i.e., if the primary channel is busy, for example, due to a STA supporting only a 1 MHz operating mode is transmitting to the AP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

Figure 1D:
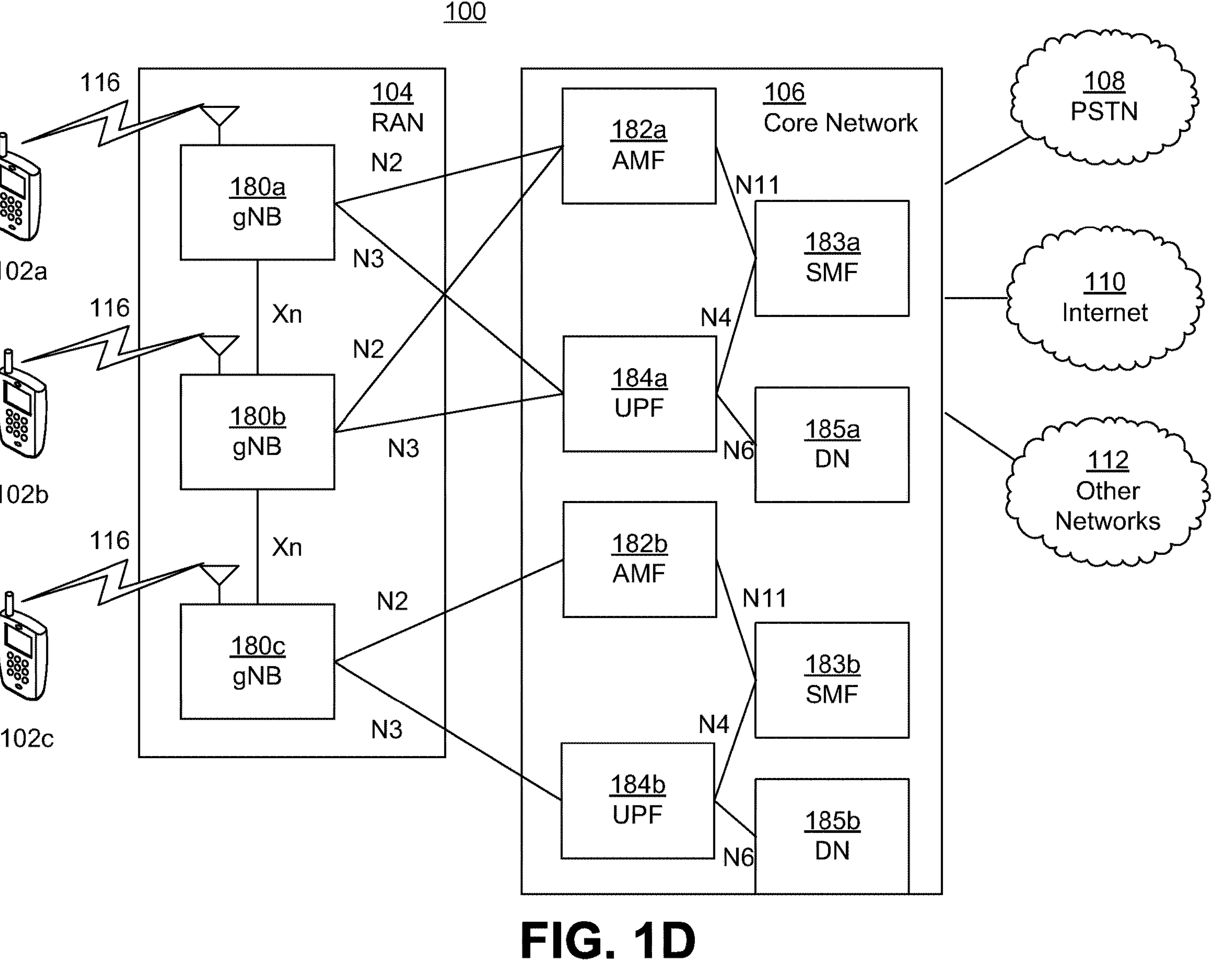
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data. It should be understood that the embodiments of FIGS. 1A-8 can be configured to perform the methods described in more detail below.

Recently, the IEEE 802.11™ High Efficiency WLAN (HEW) Study Group (SG) was created to explore the scope and purpose of possible, future amendments to enhance the quality of service all users experience for a broad spectrum of wireless users in many usage scenarios including high-density scenarios in the 2.4 GHz, 5 GHz and 6 GHz band. Embodiments described herein may send peer-to-peer traffic directly between the source and destination STAs with a direct link setup (DLS) using an IEEE 802.11e DLS or an 802.11z tunneled DLS (TDLS). New use cases which support dense deployments of APs, and STAs, and associated Radio Resource Management (RRM) technologies are being considered by the HEW SG.

Potential applications for HEW include emerging usage scenarios such as data delivery for stadium events, high user density scenarios such as train stations, or enterprise/retail environments, and also evidence for an increased dependence on video delivery, and wireless services for medical applications.

The IEEE Standard board approved the IEEE 802.11ax Task Group (TG) based on the results developed in the HEW SG.

In TGax standard meetings, several contributions showed that the measured traffic for a variety of applications has a large likelihood for short packets, and there are network applications that may also generate short packets. The applications may include: a Virtual office; a TPC ACK; a Video streaming ACK; Device/Controller (Mice, keyboards, Game controls, etc.); Access—Probe requests/responses; Network selection probe requests, ANQP; or Network management control frames.

Also, many contributions in 802.11ax have proposed the introduction of MU features that include UL and DL OFDMA and UL and DL MU-MIMO. Designing and defining a mechanism for multiplexing UL random access for different purposes may be considered in the spec.

In January 2019, the IEEE 802.11bc Task Group (TG) was created to define a MAC amendment to enhanced broadcast service (EBCS) for 802.11 devices. The IEEE 802.11bc amendment may not impact current IEEE 802.11 PHY specifications. In embodiments disclosed herein, traffic may be sent directly between source and destination STAs with a direct link setup (DLS) using an IEEE 802.11e DLS or an 802.11z tunneled DLS (TDLS).EBCS service may be in a downlink direction from an AP to non-AP STAs or may be in an uplink direction from sensor non-AP STAs. It may be the intent that enhanced Broadcast Service may be provided to both STAs that are associated or unassociated with a particular AP. An AP is expected to support up to 3000 non-AP STAs with EBCS service. In addition, there may be a class of low-cost non-AP STAs that consumes the EBCS service may not be able to transmit directly to the AP.

Some usage cases for EBCS may include: Stadium Video Broadcasting; Automotive broadcasting; Uplink Sensor Data Broadcasting; Museum Information and Multilingual Broadcasting; and Event Producer Information and Content Broadcasting.

The IEEE 802.11 Extremely High Throughput (EHT) Study Group was formed in September 2018. EHT may be considered the next major revision to IEEE 802.11 standards following 802.11ax, which is currently in the Working Group Letter Ballot Stage. EHT is formed to explore the possibility to further increase peak throughput and improve efficiency of the IEEE 802.11 networks. Following the EHT Study Group, the 802.11be Task Group was established to provide for 802.11 EHT specifications. The primary use cases and applications addressed include high throughput and low latency applications such as: Video-over-WLAN; Augmented Reality (AR); and Virtual Reality (VR).

A list of features that have been discussed in the EHT SG and 802.11be to achieve the target of increased peak throughput and improved efficiency includes: Multi-AP, Multi-Band/multi-link; 320 MHz bandwidth, 16 Spatial Streams; HARQ; AP Coordination; New designs for 6 GHz channel access.

A number of contributions have been submitted to the 802.11be TG regarding Multi-link operations, particularly on non-simultaneous transmit and receive (non-STR) operations. An example of such operation may be described as follows. An UL transmission from a non-AP Multi-link Device (MLD) on link 1 may interfere with reception on link 2 provided a potential solution using sync PPDU. The sync PPDU transmitted from AP on different links to the same non-AP MLD may have the end of PPDUs aligned. When a non-STR MLD (Multi-link Devices) is transmitting on link 1, the transmission on link 2 may effectively render any receive attempt on link 2 useless. A proposal to overcome this blindness may be to have the STA operating on link 2 attempt a number of transmissions during a medium syn delay, possibly with an altered ED (Energy Detection) level.

Various embodiments discussed herein may be directed to providing solutions to at least the following two circumstances.

In the first set of circumstances, for STAs that want to utilize downlink broadcast services provided by one or more APs, the STAs may be associated or unassociated with the APs that provide the broadcast services. The STAs and APs may need to request broadcast service and negotiate parameters for the requested broadcast services. An issue to be addressed, therefore, may be defining such MLME (MAC Layer Management Entity) primitives and providing indication and negotiation procedures to support the broadcast service discovery and parameter negotiation.

In the second set of circumstances, a non-STR MLD may have a number of STAs operating on a number of links. If STA1 transmits to its associated AP of the AP MLD on link 2, its interference may cause STA2 of the same non-STR MLD not to be able to receive any packets on link 2 at the same time. STA2 on link 2 can then be considered to be effectively blind and not aware of the channel conditions as well as not able to receive any frames to update NAV. An issue to be addressed, therefore, may be defining a procedure to effectively inform the STA2 on link so that it can efficiently utilize any idle medium time while avoiding interrupting any ongoing transmissions.

The following description may initially pertain to the issue of defining the MLME primitives as well as indication and negotiation procedures to support the broadcast service discovery and parameter negotiation. In some embodiments, an EBCS AP may advertise/announce one or more EBCSs that it provides in EBCS Info frames, EBCS Termination Notice frames, or any frames that contains EBCS ANQP element. The EBCS AP may indicate that one or more EBCSs that require association by setting the Association Required bit to 1 that are associated with the EBCSs.

In some embodiments, an EBCSEBCS|$_{[A1]}$ STA may transmit an EBCS Request frame to its associated EBCS AP to request one or more EBCSs provided by the EBCS AP. If an EBCS AP has indicated that one or more EBCSs require association, an EBCS STA may associate with the EBCS AP and subsequently transmit an EBCS Request frame to request one or more of such EBCSs. Requests for one or more EBCSs that do not require association may also be included in the same EBCS Request frame. In some embodiments, when requesting an EBCS using an EBCS Request frame, an EBCS STA may request an EBCS with a certain time to termination as indicated in Time To Termination field included in the EBCS Request frame. Additionally or alternatively, when requesting an EBCS using an EBCS Request frame, an EBCS STA may request an EBCS with a certain schedule as indicated in Schedule field included in the EBCS Request frame. The Schedule field may include EBCS broadcast frequency, EBCS Service Period duration, and EBCS Service Interval which indicates the interval between any consecutive EBCS Service Periods.

In embodiments of the invention described herein, after receiving an EBCS Request frame from an associated EBCS STA, an EBCS AP may respond with an EBCS Response frame. If the EBCS AP indicates in the EBCS Response frame that the request for an EBCS is successful, it may include a Time of Termination field to indicate the time to termination for the EBCS. It may also include EBCS service period information and the frequency of the EBCS service periods for the EBCS in the EBCS Response frame. In some cases, if the EBCS AP indicates in the EBCS Response frame that the request for an EBCS is unsuccessful, it may include a reason for failure. The reason for failure may include being unable to support requested Time to Termination, being unable to support requested Schedule, being unable to support requested EBCS broadcast frequency, being unable to support requested EBCS Service Period duration, being unable to support requested EBCS Service Interval, as well as other unknown reasons.

In some embodiments, the EBCS transmitter of an EBCS may have the authority to determine the time to termination of the EBCS. An EBCS AP may ignore an EBCS Request frame received from an unassociated STA. In other embodiments, if an EBCS AP has received an EBCS Request frames from an unassociated STA, it may respond with an EBCS Info frame advertising the EBCSs provided by the EBCS AP. If an EBCS AP has received a frame from an unassociated STA containing a EBCS Request ANQP element registering for one or more EBCSs that require association, it may respond with a frame containing an EBCS Response ANQP element indicating that the registering for the EBCSs failed, and/or the reason for failure is that the EBCSs require association.

The following paragraphs may describe the MLME procedures that support the broadcast negotiation procedures.

An MLME-EBCTERMINATIONNOTICE.request primitive may be defined. A function of the MLME-EBC-TERMINATIONNOTICE.request primitive may be to support the signaling of the termination notice of one or more EBCSs (enhanced Broadcast Service). In some embodiments, this primitive may be valid, e.g., only when the STA is an EBCS STA.

Figure 2:
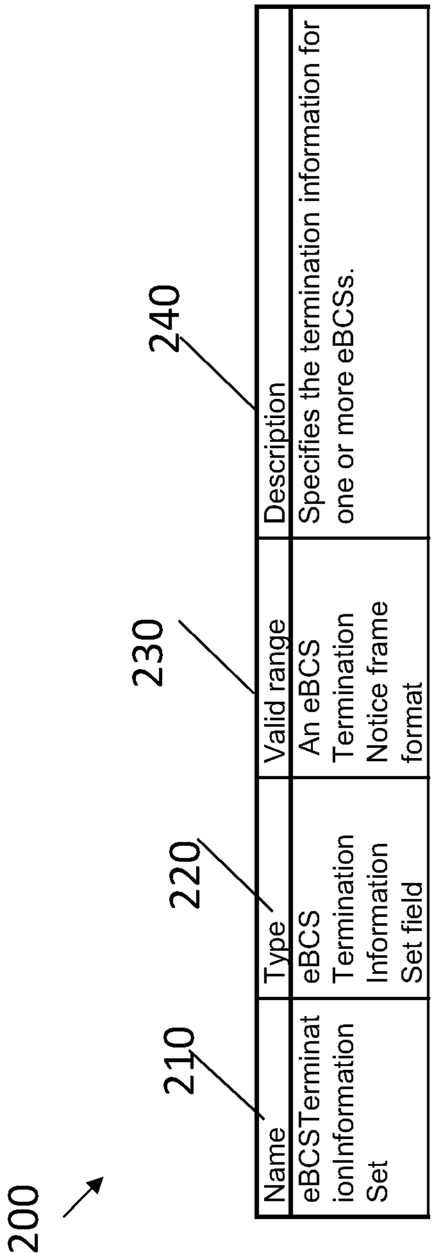
FIG. 2 provides a description of the parameters of a MLME-EBCTERMINATIONNOTICE.request primitive.

FIG. 2 defines a service primitive for the MLME-EBC-TERMINATIONNOTICE.request primitive 200 according to embodiments. As shown in FIG. 2 the Name 210 of the service primitive is EBCS Termination Information Set. The type 220 is EBCS Termination Information Set field. The Valid Range 230 is defined in 9.6.7.1 bc3 (EBCS Termination Notice frame format). The Description 240 specifies the termination information for one or more EBCSs. The semantics of the service primitive along with the primitive parameters may be as follows:

```
MLME-EBCSTERMINATIONNOTICE.request(
  EBCSTerminationInformationSet
  )
```

The MLME-EBCTERMINATIONNOTICE.request primitive 200 may be generated by request that an EBCS Termination Information frame be sent. The effect of the receipt thereof may be that the STA sends an EBCS Termination Notice frame.

An MLME-EBCTERMINATIONNOTICE.indication primitive may be defined. The function of the MLME-EBCTERMINATIONNOTICE.indication primitive may be that it indicates that an EBCS Termination Notice frame is received. In some embodiments, this primitive may be valid, e.g., only when the STA is an EBCS STA.

Figure 3:
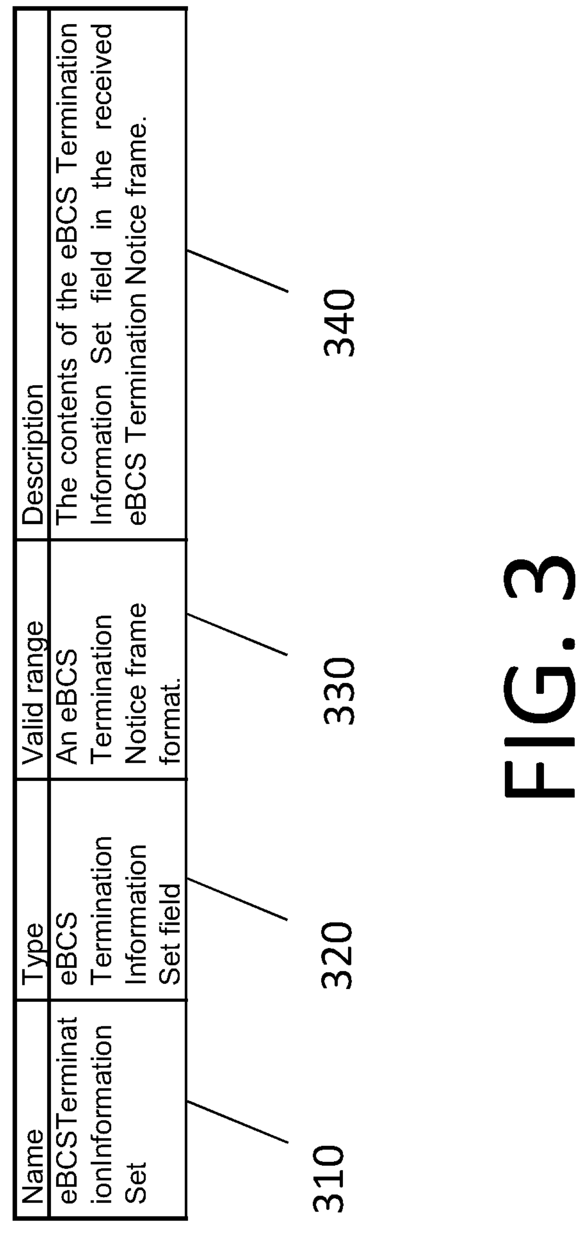
FIG. 3 provides a description of the parameters of a MLME-EBCTERMINATIONNOTICE.indication primitive.

FIG. 3 provides a description of the parameters of the MLME-EBCTERMINATIONNOTICE.indication primitive 300. As shown in FIG. 3, the parameter Name 310 is EBCS Termination Information Set. The parameterType 320 is EBCS Termination Information Set filed. The Valid range 330 is defined in 9.6.7.1 bc3 (EBCS Termination Notice frame format). The parameter Description 340 is the contents of the EBCS Termination Information Set field in the received EBCS Termination Notice frame.

In another aspect, the parameters described in FIG. 3 can be expressed semantically in terms of their primitive as follows. The semantics of the service primitive along with the primitive parameters may be as follows:

```
MLME-EBCSTERMINATIONNOTICE.indication(
  EBCSTerminationInformationSet
  )
```

The MLME-EBCTERMINATIONNOTICE.indication primitive 300 may be generated by the MLME when an EBCS Termination Notice frame is received. The effect of the receipt thereof may be that the SME is notified of the receipt of an EBCS Termination Notice frame.

An MLME-EBCS.request primitive may be defined. The function of the MLME-EBCS.request primitive may be that it supports the signaling of the negotiation of one or more EBCSs with a specified peer MAC entity, for example, a peer MAC entity within an associated AP. In some embodiments, this primitive may only be valid when the STA is an EBCS STA.

FIG. 4 provides a description of the parameters of the MLME-EBCS.request primitive. As shown in FIG. 4 a first parameter 405 comprises a parameter name 434, PeerSTAAddress; a parameter type 435—MAC Address; a valid range (440) which can be any valid individual MAC address, and a description 445 of the parameter—the MAC address of the peer MAC entity within an associated AP to which the EBCS Request frame is transmitted. A parameter 410 comprises a parameter name 410—Dialog Token, a parameter type 435—Integer, a valid range 440 which can be 1-255, and a parameter description 445—the dialog token to identify the EBCS negotiation transaction. A third parameter 412 comprises a parameter Name 434—EBCSRequest, a parameter type 435—EBCS Request element, a Valid range 440—valid range-as defined in 9.4.2bc2 (EBCS Request element) and a parameter description 445—specifies the request information for one or more EBCSs.

In another aspect, the semantics of the service primitive 400 along with the primitive parameters may be as follows:

```
MLME-EBCS.request(
  PeerSTAAddress,
  DialogToken,
  EBCSRequest
  )
```

The MLME-EBCS.request primitive may be generated by the SME when a STA wishes to negotiate for one or more EBCSs with a specified peer MAC entity within an associated AP. The effect of the receipt thereof may be that this primitive initiates an EBCS negotiation procedure. In some embodiments of the invention, the STA may send an EBCS Request frame to a specific MAC entity within an associated AP. In the case that a response is received from the responder STA, the MLME may subsequently issue an MLME-EBCS.confirm primitive that reflects the results.

An MLME-EBCS.confirm primitive may be defined. The function of the MLME-EBCS.confirm primitive may be that it reports the results of the EBCS Negotiation procedure within a specified MAC entity, for example, a MAC entity that is within an associated AP. In some embodiments, this primitive may only be valid when the STA is an EBCS STA.

Figure 5:
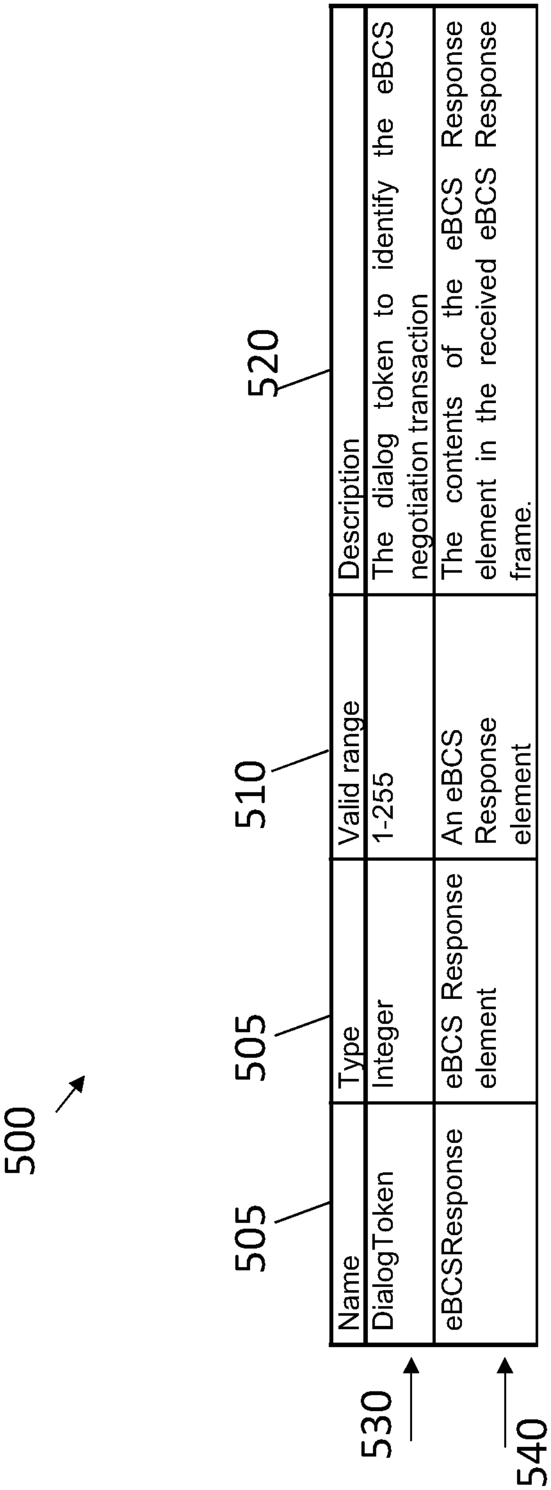
FIG. 5 provides a description of the parameters of a MLME-EBCS.confirm primitive.

FIG. 5 provides a description of the parameters of the MLME-EBCS.confirm primitive 500. As shown in FIG. 5 a first parameter 530 comprises a name 505—Dialog Token; a type 510—Integer; a Valid range 510, which can be 1-255, and a description 520—The dialog token to identify the EBCS negotiation transaction. A second parameter 540 comprises a parameter name 505—EBCSResponse, a type 505—EBCS Response element, a valid range 510—as defined in 9.4.2.bc3, and a description 520—The contents of the EBCS Response element in the received EBCS Response frame.

In another aspect, the semantics of the service primitive 500 along with the primitive parameters may be as follows:

```
MLME-EBCS.confirm(
  DialogToken,
  EBCSResponse
  )
```

The MLME-EBCS.confirm primitive may be generated by the MLME as a result of an MLME-EBCS.request primitive or receipt of an EBCS Response frame from a peer MAC entity that is within an associated AP. The effect of the receipt thereof may be that the SME is notified of the results of the EBCS negotiation procedure.

An MLME-EBCS.indication primitive may be defined. The function of the MLME-EBCS.indication primitive may be that it indicates that a peer MAC entity is requesting EBCS negotiation with a local MAC entity, which may be an AP. In some embodiments of the invention, this primitive may only be valid when the STA is an EBCS STA.

FIG. 6 provides a description of the parameters of the MLME-EBCS.indication primitive 600. As shown in FIG. 6 a first parameter 610 comprises a parameter name 635—PeerSTAAddress, a parameter type 640—MAC Address, a valid range 645 of parameter values-Any valid individual MAC Address, and a description 650—Specifies the MAC address of the peer MAC entity from which the EBCS Request frame is received. A second parameter 620 comprises a parameter name 635—Dialog Token, a parameter Type 640—Integer, a valid range 645 of values-1-255 and a Description 650—The dialog token to identify the EBCS negotiation transaction. A third parameter 630 comprises a parameter Name 645—EBCSRequest, a parameter Type 640—EBCS Request element, a Valid range 645—as defined in 9.4.2.bc (EBCS Request element) and a Description 650—Specifies the request information for one or more EBCSs. In another aspect, the semantics of the service primitive 600 along with the primitive parameters may be as follows:

```
MLME-EBCS.indication(
  PeerSTAAddress,
  DialogToken,
  EBCSRequest
  )
```

The MLME-EBCS.indication primitive may be generated by the MLME as a result of receipt of an EBCS Request frame from a specific peer MAC entity. The effect of the receipt thereof is that the SME is notified of the receipt of an EBCS Request frame.

An MLME-EBCS.response primitive may be defined. The function of the MLME-EBCS.response primitive may be that it is used to send a response to a specific MAC entity that requested negotiation for one or more EBCSs with the STA that issued this primitive, which may be an AP. In some embodiments, this primitive may only be valid when the STA is an EBCS STA.

FIG. 7 provides a description of the parameters of the MLME-EBCS.response primitive 700. As shown in FIG. 7 a first parameter 710 comprises a name 740—PeerSTAAddress, a parameter Type 750—MAC Address, a Valid range 760—Any valid individual MAC Address, and a Description 770—Specifies the MAC addresses of the peer MAC entity to which the EBCS Response frame is transmitted. A second parameter 720 comprises a Name 740—'Dialog Token', a Type 750 'Integer', a Valid range 760, which can be 1-255, and a Description 770—The dialog token to identify the EBCS negotiation transaction. A third parameter 730 comprises a Name 740—EBCS Response, a Type 750—'EBCS response element, a Valid range 760—as defined in 9.4.2.bc3 (EBCS Response element) and a description 770—Specifies the results and information of the EBCS negotiation procedure. In another aspect the semantics of the service primitive 700 along with the primitive parameters may be as follows:

```
MLME-EBCS.response(
  PeerSTAAddress,
```

-continued

```
  DialogToken,
  EBCSResponse
  )
```

The MLME-EBCS.response primitive may be generated by the SME of a STA that may be an AP as a response to the MLME-EBCS.indication primitive. The effect of the receipt of this primitive may be that is that initiates the transmission of an EBCS Response frame to a specific MAC entity that requested EBCS negotiation.

FIG. 9 illustrates a sequence of actions or signals comprising a method 900 according to one embodiment. At 902 an AP SME sends an MLME-EBCSTERMINATION.request primitive 99 to an AP MAC. AT 904 the AP MAC transmits a Termination Notice Frame 920 to a STA MAC. At 932 the STA MAC sends an MLME-EBCSTERMINATION.indication primitive 930 to the STA SME.

FIG. 10 illustrates a sequence of actions or signals comprising a method 950 according to one embodiment. At 956 the STA SME transmits a MLME-EBCS.request Primitive 955 to the STA MAC. At 957 the STA MAC transmits an EBCS Request Frame 960 to the AP MAC. AT 958 the AP MAC transmits an MLME-EBCS.indication primitive to the AP SME. At 959 the AP SME sends an MLME-eCBS.response primitive 980 to the AP MAC. AT 981 the AP MAC sends an EBCS Response Frame 975 to the STA MAC. At 982 the STA MAC sends an MLME-EBCS.confirm primitive 970 to the STA SME.

Figure 11:
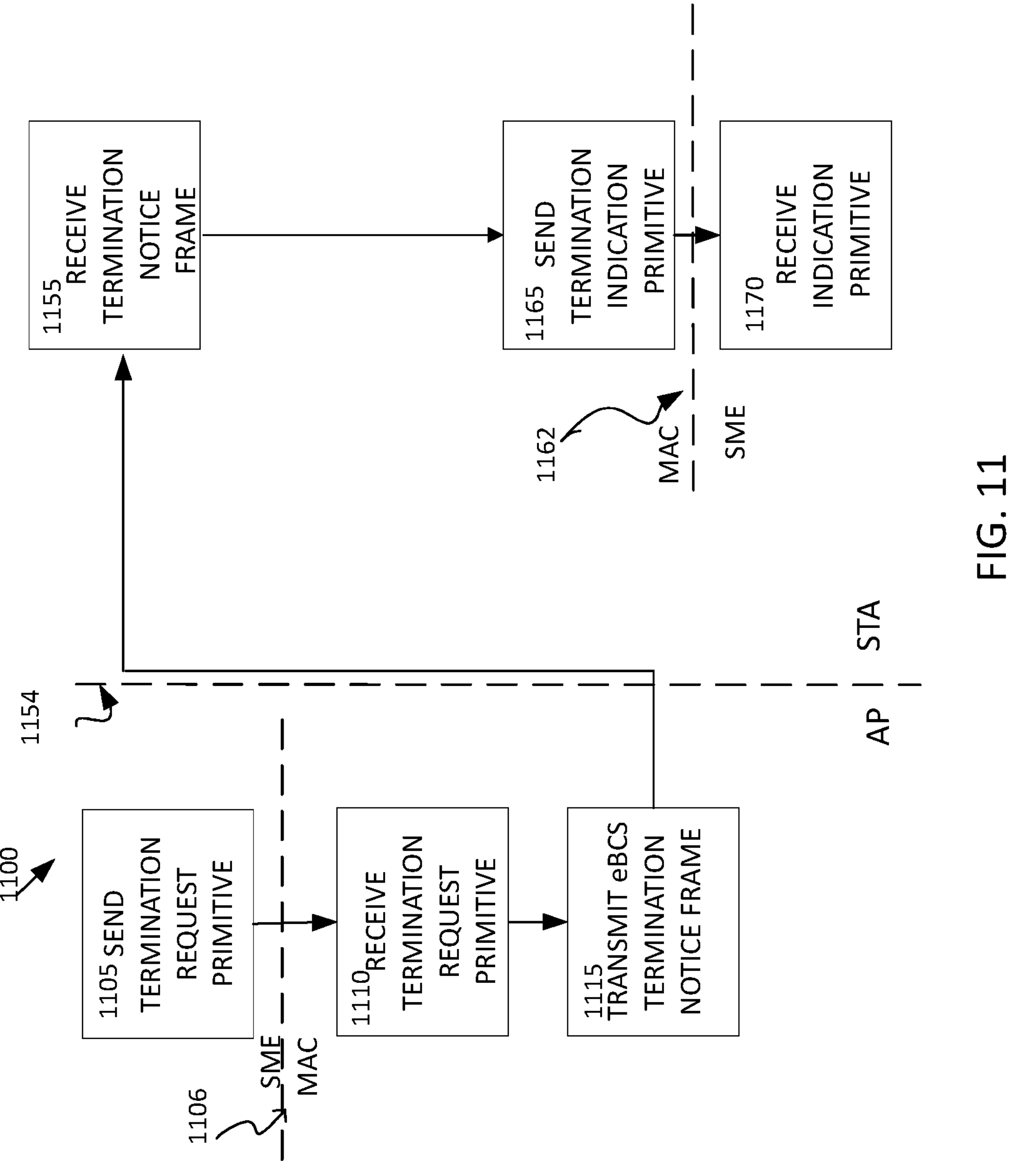
FIG. 11 is a flowchart illustrating actions performed according to embodiments of a method disclosed herein.

FIG. 11 is a flowchart illustrating the actions corresponding to the signal flows illustrated in FIGS. 9 and 10. In FIG. 11 actions performed by an AP are shown to the left of line 1154 and actions performed by a STA are shown to the right of line 1154. Likewise, actions performed by an SME component of the AP are show above line 1106 and below line 1131. Actions performed by a MAC component of the AP are shown below line 1106 and above line 1131. Similarly, actions performed by a MAC component of the STA are shown above line 1162 and below line 1171. Actions performed by an SME component of the STA are shown below line 1162 and above line 1171.

Actions performed by the AP are as follows. At 1105 an SME component of the AP sends an MLME-EBCSTERMINATIONNOTICE.request primitive (FIG. 9 at 99) to a MAC component of the AP. This primitive is generated by the SME to request an EBCS EBCSTermination Information Notice frame be sent. At 1110 the AP MAC component receives the EBCSTERMINATIONNOTICE.request primitive. In response to receiving the EBCSTERMINATIONNOTICE.request primitive, the AP MAC at 1115 transmits a Termination Notice Frame to the MAC component of the STA.

At 1155 the MAC component of the STA receives the EBCS Termination Notice Frame. The STA MAC sends to the STA SME at 1165 an MLME-EBCSTERMINATION.indication primitive. At 1170 the STA SME receives the MLME-EBCSTERMINATION.indication primitive.

Figure 12:
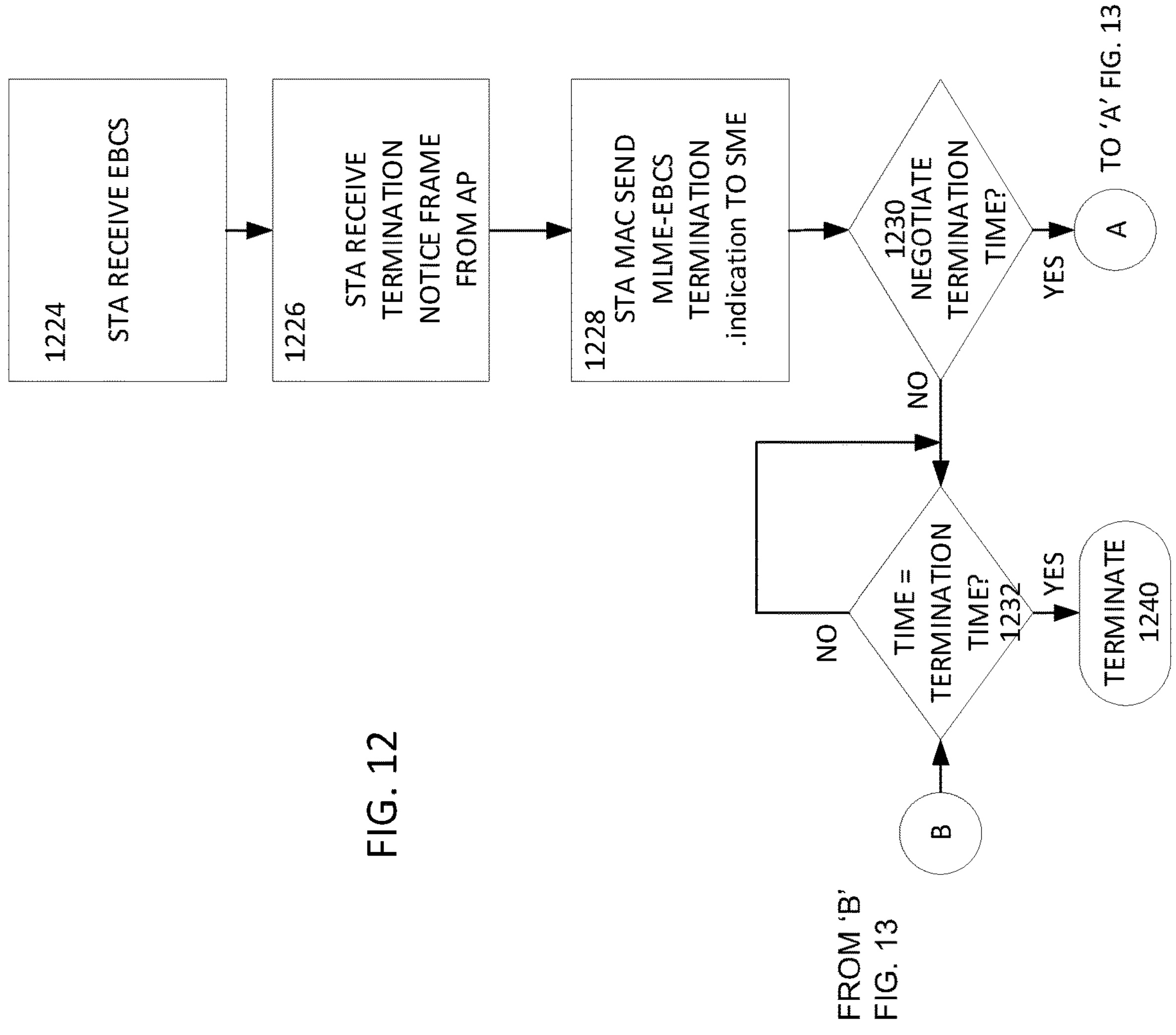
FIG. 12 is a flowchart illustrating actions performed according to embodiments of a method disclosed herein.

FIG. 12 is a flowchart illustrating actions comprising a method performed by a STA 1400 (with reference to FIG. 14) according to some disclosed embodiments. At 1224 STA 1400 is receiving an EBCS traffic stream. At 1226 STA 1400 receives an EBCS Termination Notice Frame from an AP. At 1228 STA MAC component 1404 sends an EBCSTERMINATION.indication to STA SME component 1425. At 1230 STA SME component 1425 determines whether to negotiate a termination time with the AP. This determination may be based on whether the STA desires to continue receiving the EBCS traffic stream, and whether the termination time indicated by the AP is premature. If STA SME component 1425 decides to negotiate a termination time with the AP, the method proceeds from 'A' in FIG. 12 to 'A' in FIG. 13 and the STA SME at 1302 generates an MLME-EBCS.request primitive (illustrated in FIG. 4). At 1304 the STA SME component 1425 sends the MLME-EBCS.request primitive to the STA MAC component 1404. At 1306 the STA MAC component 1404 cooperates with the STA transceiver (TXRX) 1409 to provide an EBCS Request Frame to STA transceiver 1412, 1414. At 1308 STA transceiver 1412 1414 transmits the EBCS Request Frame to the AP. For example, the STA may transmit a request frame 960 pursuant to performing actions as shown in FIG. 10. At 1310 STA transceiver 1412, 1414 receives an EBCS Response Frame from the AP. The EBCS Response Frame received from the AP may or may not include a new termination time, as described above. At 1320 STA MAC component 1404 sends an MLME-EBCS.confirm primitive to STA SME component 1425. Flow exits at B in FIG. 13 and returns to the flow in FIG. 12 at point B. AT 1232 the STA determines whether the termination time (or time to termination) has arrived. If the time to termination has arrived the STA terminates its receiving of the EBCS at 1240. Otherwise, the STA continues to receive the EBCS until the STA determines at 1232 the termination time has arrived. When the termination time has arrived at 1232, the AP terminates transmission of the EBCS traffic stream, and the STA terminates receiving of the EBCS traffic stream at 1240.

In some embodiments STA 1400 may receive a Termination Notice Frame from an AP, e.g., as illustrated in FIG. 9. The Termination Notice Frame may convey a time to termination of the EBCS being received by the STA. In response to receiving the Termination Notice Frame, STA MAC 1404 sends at 1235, an MLME-EBCSTERMINATION.indication primitive to STA SME component 1425 (as shown in FIG. 9 at 930). STA 1400 determines whether the termination time has arrived at 1240. In case the termination time has arrived, STA 1400 stops receiving the EBCS at 1242. Otherwise, STA 1400 may continue to receive the EBCS at 1224.

Figure 13:
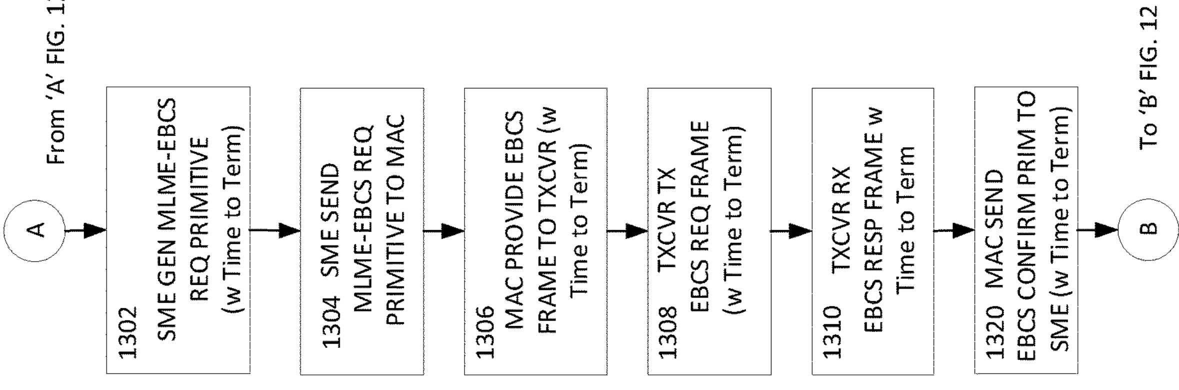
FIG. 13 is a flowchart illustrating actions performed according to embodiments disclosed herein.

In case STA 1400 does not receive a Termination Notice Frame from an AP, STA 1400 may continue to receive the EBCS. In some embodiments a STA 1400 receiving an EBCS as per 1224, can decide at 1230 whether or not to negotiate with an AP a time for the AP to terminate its sending of the EBCS to STA 1400. In that case, the method proceeds at point A, as shown in FIG. 13. Otherwise, STA 1400 continues to receive the EBCS until a termination time arrives as specified in a Termination Notice Frame.

FIG. 13 shows a method for STA 1400 to negotiate a termination time with the AP starting at point A which corresponds to point A in FIG. 12. At 1302 STA SME component 1425 generates an MLME-EBCS.request Primitive (shown in FIG. 10 at 955). The request primitive includes a field indicating a particular time the AP is requested to terminate the EBCS. In some embodiments the field can indicate a time period, the end of which a termination is requested. Either way, at 1304 STA SME component 1425 sends the MLME-EBCS.request primitive, including the requested termination time indication to STA MAC component 1404 (shown in FIG. 10 at 960). At 1306 STA MAC component 1404 cooperates with STA transceiver 1412, 1414 to provide an EBCS Request Frame, including the requested termination time indication, to STA transceiver 1412, 1414. At 1308 STA transceiver 1412, 1414 transmits the EBCS Request Frame, including the requested termination time indication, to the AP (shown in FIG. 10 at 960).

At 1310 STA transceiver 1412, 1414 receives from the AP an EBCS Response Frame (shown in FIG. 10 at 975). The EBCS response frame may include an indication of confirmation of the AP that the AP will terminate the EBCS at the requested termination time. At 1320 STA MAC component 1404 sends an MLME-EBCS.confirm primitive to STA SME component 1404 (shown in FIG. 10 at 970). In some embodiments STA MAC component 1404, or STA SME component 1425, may store the termination time indicated in the EBCS Response Frame, e.g., in an MIB database 1419, or in other memory associated with STA 1400.

The negotiation procedure of FIG. 13 exits at point B in FIG. 13 and enters the method of FIG. 12 at point B in FIG. 12. At 1240 in case the termination time has arrived STA 1400 ends receiving the EBCS. Otherwise, STA 1400 continues to receive the EBCS at 1224 until a termination time arrives.

Described herein are Non-STR Blindness Recovery Procedures.

In some embodiments described herein, a non-STR (NSTR) non-AP MLD may contain more than two STAs, with STA 1 operating on link 1 and STA1 operating on link 2. The NSTR non-AP MLD may be associated with an AP MLD. The AP MLD may contain more than two APs, with AP1 operating on link 1 and AP2 operating on link 2. STA1 may be associated with AP1 and STA2 may be associated with AP2.

In some embodiments, if the AP MLD is STR, then AP1 and AP2 may transmit and receive concurrently on link 1 and link 2. The AP MLD and non-AP MLD may follow the following transmission and reception procedures to ensure a correct NSTR blindness recovery.

For instance, when STA1 of the NSTR non-AP MLD transmits a PPDU on link 1, and while STA2 is not transmitting, STA2 may not start transmitting at least a MediumSyncDelay from the end of the transmission of STA1 on link 1 or until STA2 has received a valid packet on link 2 to correctly set the NAV or until STA2 has received a valid packet on link 2 with valid TXOP setting contained in the PHY/EHT preamble, until the Intra-BSS NAV timer and/or Inter-BSS NAV timer have expired, or until a trigger has been received from AP2 that addresses STA2 or solicit random access from associated or unassociated STAs, whichever is earlier.

In some embodiments, additionally or alternatively to the above, when STA1 has solicited or is expecting on link 1 an immediate response packet to its transmitted frames, such as an acknowledgment (ACK)/block acknowledgment (BA)/Multi-STA BA frames, STA2 may not transmit on link 2 until at least the end of the expected response frame, or until at least SIFS+expected_length_of_response_frame time after the transmission of STA1 on link 1.

In some embodiments, the AP MLD, for example, AP1, may respond with an ACK or BA or Multi-STA BA on link 1 after receiving the packet transmitted by STA1, if a response frame is solicitated by STA1. If the medium is idle on link 2, then AP2 may replicate the response frame on link 2 with the correct NAV setting for link 2. In another example, AP2 may re-transmit a previously transmitted BA/ACK/Multi-STA BA on link 2 with the correct NAV setting for link 2.

In some examples, AP2 may transmit an NDP frame on link 2 which may contain the correct TXOP setting in its preamble. In one or more of these examples, AP2 may only send a packet on link 2 if the packet is expected to end before MediumSyncDelay after the transmission end for STA1 on link 1. If AP1 has received a packet from STA1 on link 1, and STA2 is not transmitting, and if AP2 is to transmit a packet on link 2 to one or more STAs, the AP2 may ensure that the packet on link shall be transmitted at sufficient transmit power and using a MCS, i.e., select a transmit power and/or MCS that are at least sufficient for the case when AP2 is transmitting to STA2 so that STA2 can correctly decode the packet.

In yet another example, AP2 may transmit a trigger frame that either solicits transmission from STA2 or has allocated random access resources for associated or unassociated STAs.

If the AP MLD is NSTR, then AP1 and AP2 cannot transmit and receive concurrently on link 1 and link 2. The AP MLD and non-AP MLD may follow a similar transmission and reception procedures to ensure a correct NSTR blindness recovery.

Non-STR Blindness Recovery Procedures are described herein. The solutions presented herein may address the issues discussed in the second problem statement described substantially in paragraphs above.

ML Restricted Transmissions are described herein. An MLD operating on NSTA links may have a NAV setting with a non-zero NAV count on Link 2 and try to use the opportunity to perform ML restricted transmission on Link 1. As shown in FIG. 1, the ML restricted transmission duration may be shorter than or equal to the NAV duration on Link 2. The MLD may switch to Link 2 to resume NAV and contend the channel right after the ML restricted transmission.

Figure 8:
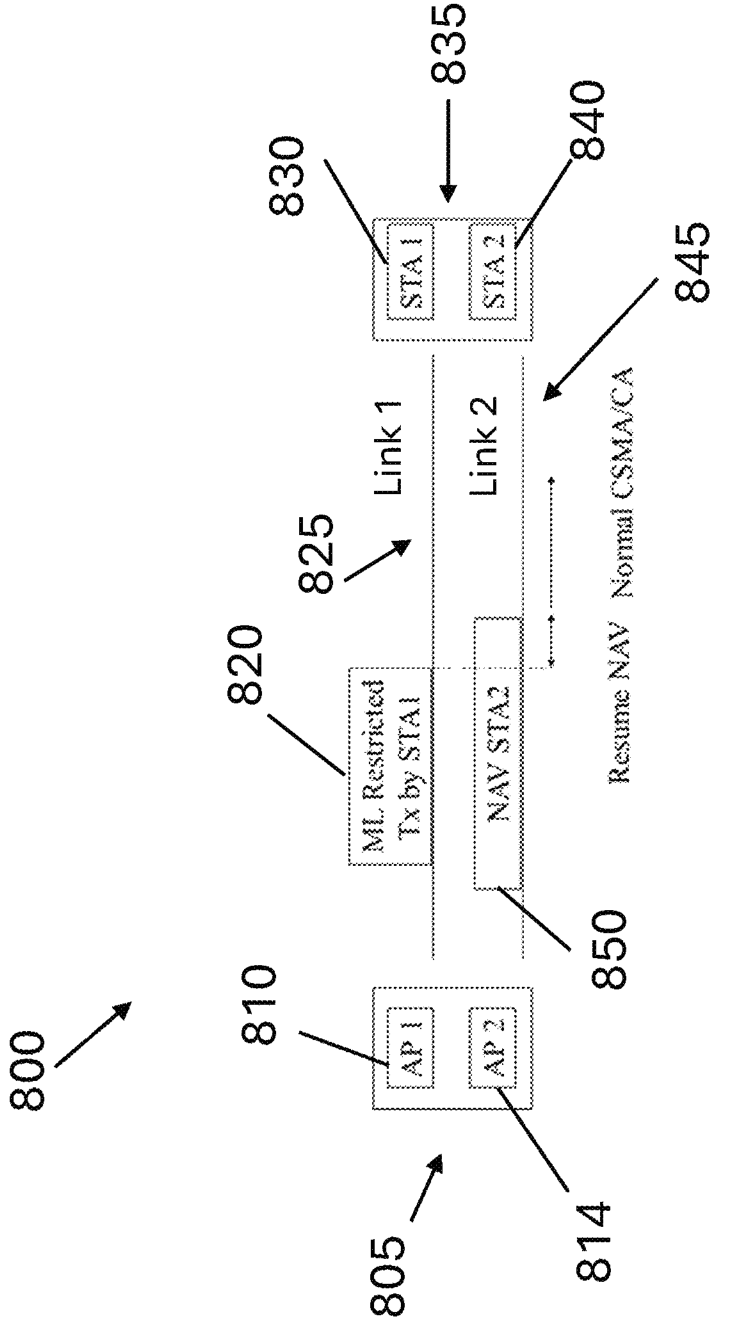
FIG. 8 illustrates an example of a ML restricted transmission.

FIG. 8 illustrates an example of a ML restricted transmission 820. An ML restricted transmission procedure may be described as follows.

An MLD 835 may operate on NSTR links 825, 845, e.g., STA1 830 affiliated with the MLD 835 may operate on Link 1 825 and STA 2 840 affiliated with the MLD 835 may operate on Link 2 845. The MLD 835 may indicate that it has the capability to support ML restricted transmission.

A STA (which may be a non-AP MLD) affiliated with the MLD 805 (which may be an AP MLD) may have a NAV setting with non-zero NAV count for a period on its link, e.g., STA2 840 on Link 2 845 may have a non-zero NAV setting 850. In one method, the frame which set NAV on Link2 may carry an indication that the NAV duration may not be extended/modified and/or the STAs (e.g., STAs of the non-AP MLD) which have NAV setting on Link2 may be allowed to perform ML restricted transmission on other NSTR links. In one method, the MLD may consider performing ML restricted transmission on Link 1 if the NAV count/period may be greater than a predefined/predetermined threshold. In one method, the threshold may be signaled and assigned by the AP MLD in a management/control frame. In one method, the threshold may be a MLD level setting, i.e., the value may be applied to all STAs affiliated with the MLD. In some methods, the threshold may be a per-link setting, i.e., STAs affiliated with the MLD may have different threshold.

An STA affiliated with the MLD on one link without NAV setting (NAV count is zero) may try to perform ML restricted transmission within the NAV count/period on another link. For example, STA1 on Link 1 may have traffic to transmit. STA1 may acquire a transmission opportunity on Link 1. STA1 may know from MLD that STA2 may have non-zero NAV setting on Link 2 and STA1 may know the expected silence duration, say T_NAV_otherlink of the NAV setting on Link 2. STA1 may transmit the traffic and make the PPDU length+expected feedback (e.g., ACK/BA etc.) less than T_NAV_otherlink. In other words, STA1 may truncate the transmission to make it less than the NAV count on Link 2.

In some methods, STA1 may indicate that the transmission is ML restricted transmission, and it may need to complete the restricted TXOP in a certain period.

In some methods, STA1 may indicate it may go to sleep mode after the ML restricted transmission on Link 1 and contend channel and transmit on Link 2.

In some methods, STA1 may indicate the estimated duration of the sleep mode due to transmission on Link 2.

The indications mentioned above may be carried in the frame it transmitted. In one method, the information may be carried in MAC header such as A-Control field. In one method, the information may be carried in the PHY header of the transmitted PPDU. In one method, the information may be carried in a control frame which may be aggregated to other frames and carried in the PPDU.

STA2 may pause the NAV count down on Link 2 and record it as NAV_pause.

STA1 may go to sleep mode after the ML restricted transmission. STA2 may operate normally on Link2 right after the ML restricted transmission. STA2 may resume the NAV count down by resetting the NAV value to NAV=NAV_pause−T_ML_restricted, where T_ML_restricted is the duration used for ML restricted transmission on Link 1. STA2 may not need to start a MediumSyncDelay timer in this case.

It should be noted that the above mentioned methods may apply to a case where it is assumed that: the operation links may be STR; and/or one of the MLD between the transmit MLD and receive MLD, e.g., the non-AP MLD, may operate in the Enhanced multi-link single radio (EMLSR) mode.

AP Assisted Blindness Recovery Protocols are described herein.

An NSTR non-AP MLD may request assistance from an AP MLD to provide synchronization assistance on NSTR links on which the NSTR non-AP MLD operates, or on the links pairs the STA MLD has informed the AP MLD that are operating in NSTR mode.

A non-AP STA, STA1, affiliated with a non-AP MLD, may operate on link 1, and a second non-AP STA, STA2, may operate on link 2, and STA1 and STA2 are considered to be operating in NSTR mode, the non-AP MLD may have informed the AP MLD of such NSTR mode that the non-AP MLD is operating in. Link 1 and link 2 may be indicated as an NSTR pair in the basic variant of multi-link (ML) element transmitted by STA1 or STA2. STA 1 and STA2 are associated respectively with AP1 and AP2 that are affiliated with an AP MLD.

In a basic variant of ML element, STA1 or STA2 may indicate that it requires AP Assisted Blindness Recovery. For example, a bit in the Common Info field or in each of the Per STA Profile or in the field of NSTR pair indication, or any other subfield, may indicate that the MLD or STA is requesting AP Assisted Blindness Recovery.

In a basic variant of ML element or through other means, AP1 or AP2 may indicate that it provides AP Assisted Blindness Recovery. For example, a bit in the Common Info field or in each of the Per STA Profile or in the field of NSTR pair indication, or any other field or subfield, may indicate that the MLD or AP is granting or providing AP Assisted Blindness Recovery.

A STA, for example STA1, may be transmitting for a period of time on Link 1 which may exceed a certain threshold, and STA2 may lose its medium synchronization because STA2 cannot receive any packets on Link2 due to interference from STA1. To assist STA2 to recover synchronization if the AP is capable of assisted blindness recovery, STA1 may indicate in the transmitted packet, for example, in the PHY or MAC header a request the AP MLD assist blindness recovery.

In one example, such a request may be indicated by an A-Control header, which may contain a Link ID bitmap and a Request Frame types. Such an A-Control header may be an AAR (AP Assistance Requested) A-Control header. The Link ID bitmap may indicate for which link the AP assistance is requested. In another example, the Link ID indication may be explicit and indicate the ID of each of the IDs indicated. The Request Frame type in the PHY or MAC or A-Control header may indicate which kind of synchronization packet or transmission is requested. The Requested Frame Type may contain any of the following indicated for synchronization packet or transmission requested.

For example, the Requested Frame Type may indicate an NDP packet: the NDP may contain the proper NAV setting in the PHY header or other parts on the NSTR link that the NDP is transmitted.

The Requested Frame Type may indicate Duplicate ACK/BA frames: the ACK/BA may contain the proper NAV setting and frame body may contain the duplicate content of the ACK/BA that is transmitted on link1 in response to the current transmission in which the Multi-link Trigger frame is transmitted.

The Requested Frame Type may indicate a Trigger frame: the trigger may be addressed on the non-AP STA that is associated with the same non-AP MLD as the transmitting STA or a trigger frame that may trigger random access for associated STAs on the link the trigger frame is transmitted.

The Requested Frame Type may indicate a Regular packet: the regular frame may be transmitted on the known NSTR requested links which may contain the proper NAV information for that NSTR link.

The non-AP MLD may restrict the request for assisted blindness recovery depending on the status of its transmit queues. If the non-AP MLD does not have one or more MPDUs in its transmit queue the non-AP MLD may not send the request for assisted blindness recovery. Alternatively, or additionally, if there are no MPDUs in the transit queue, the non-AP MLD may be restricted from requesting assisted blindness recovery. Other restrictions on when arrested blindness recovery can be requested may be implemented. Restrictions based on the priority of the MPDUs in the queue can be implemented. For example a non-AP MLD may, e.g., only request assisted blindness recovery if it has pending high priority MPDUs in its queue. A restriction based on the number of MPDUs in the queue can also be implemented. For example a non-AP MLD may have to have more than 3 MPDUs in its queue to request assisted blindness recovery. A restriction based on how full the non-AP MLD queue is may also be implemented. For example a non-AP MLD may have to have a 25% full queue to request assisted blindness recovery.

In some examples, the Requested Frame type may be implicit. The indication for requested AP assistance for blindness recovery may be just one bit, and when the indication is set, it may be determined that a trigger frame or an NDP packet, a duplicate ACK/BA, or a regular frame is requested.

An AP that received a packet from a non-AP STA that contains an indication or PHY/MAC header fields that requests AP assisted blindness recovery, may follow the protocols described below as follows.

If an indication for a requested AP assistance for blindness recovery is received, and if the requested frame type used for blindness recovery may be implicit, such as NDP packet, duplicate ACK/BA frames, trigger frame, or regular packet, the AP may transmit a requested packet or frame, on the known or requested NSTR link(s) that is associated with the non-AP MLD with which the non-STA is affiliated which transmitted the received frame containing the indication for requested AP assistance for blindness recovery. In an example, the AP may transmit the requested packets on the links for which Requested AP Assistance for blindness recovery are indicated in the UL transmissions from the non-AP STA that is affiliated with an NSTR non-AP MLD. The AP may not transmit the request packet on one or more of these known NSTR links if the medium on these NSTR links is busy, and/or, if the transmitted packet will exceed the MediumSyncDelayTimer, or if the AP has already packets queues to transmit to other STAs on one or more of these other known NSTR links. In some examples, the AP may transmit a duplicated ACK/BA on the requested frame or packet.

If an indication for a requested AP assistance for blindness recovery is received, and if a particular type of packet used for blindness recovery is indicated, such as NDP packet, duplicate ACK/BA frames, trigger frame, or regular packet, the AP may transmit a requested packet or frame, on the known or requested NSTR link(s) that are associated with the non-AP MLD with which the non-STA is affiliated and which transmitted the received frame containing the indication for requested AP assistance for blindness recovery or on the indicated requested links. The AP may not transmit the request packet on one or more of these known NSTR links if the medium is busy, and/or, if the transmitted packet will be exceed the MediumSyncDelayTimer, or if the AP has already packets queues to transmit to other STAs on one or more of these other known NSTR links.

In another example, a non-AP STA that is affiliated with a NSTR MLD may trigger multi-link transmissions to request the AP MLD or the AP to assist its blindness recovery. When STA1 on link1 is completing its transmission on link1 and wants to request AP assisted blindness recovery, it may include a multi-link trigger frame in the A-MPDU that it is transmitting to AP1. The multi-link trigger frame may contain one or more of the following information.

The multi-link trigger frame may contain a multi-link trigger type: this field may indicate that the frame is a multi-link trigger, which may be used for blindness recovery or medium synchronization, which may be caused after NSTR transmissions or the current transmission.

The multi-link trigger frame may contain one or more Requested Frame types: the requested frame type may indicate the type of frames that the non-AP STA is requesting the AP MLD to transmit on one or more of NSTR links, such as NDP packet, Duplicate ACK/BA frames, Trigger frame, Regular packet. In case of an NDP packet, the NDP may contain the proper NAV setting in the PHY header or other parts on the link that the NDP is transmitted. In case of Duplicated ACK/BA frames, the ACK/BA may contain the proper NAV setting and framebody may contain the duplicate content of the ACK/BA that is transmitted on link1 in response to the current transmission in which the Multi-link Trigger frame is transmitted. In case of a trigger frame, the trigger may be addressed on the non-AP STA that is associated with the same non-AP MLD as the transmitting STA, e.g., on the requested link(s), or a trigger frame that may trigger random access for associated STAs on the link the trigger frame is transmitted. In case of a regular frame, the regular frame may be transmitted on the requested links which may contain the proper NAV setting on that NSTR link.

Requested Links: the requested links may indicate one or more NSTR links for which blindness recovery assistance or medium synchronization assistance is requested.

Maximum delay: this field may indicate the maximum delay for which the requested frames are requested. If the APs on one or more NSTR links could not transmit the requested frames before the maximum delay, the AP should not transmit the requested frames on those NSTR links. In one implementation, the maximum delay equals to the MediumSyncDelayTimer or the initial value of the MediumSyncDelayTimer.

An AP that received a multi-link trigger frame from a non-AP STA that may request AP assisted blindness recovery or medium synchronization may follow one of or a portion of one of the following protocols:

The AP may transmit a requested packet or frame, such as an NDP packet, duplicate ACK/BA frames, trigger frame, or regular packet, on the know NSTR link(s) that is associated with the non-AP MLD with which the non-STA is affiliated which is the transmitted of the received frame containing the indication for requested AP assistance for blindness recovery. In an example, the AP may transmit the requested packets on the links for which Requested AP Assistance for blindness recovery are indicated in the Multi-link Trigger frame from the non-AP STA that is affiliated with an NSTR non-AP MLD. The AP may not transmit the request packet on one or more of these known or requested NSTR links if the medium on these NSTR links is busy, and/or, if the transmitted packet will be exceed the MediumSyncDelayTimer, or if the transmission will exceed the maximum delay, or if the AP has already packets queues to transmit to other STAs on one or more of these other known NSTR links. In some examples, the AP may transmit a duplicated ACK/BA on the requested packet or frame.

An AP that receives a multi-link trigger frame from a non-AP STA requesting AP assistance may monitor the link that AP assisted blindness recovery or medium synchronization is requested for.

If the AP is aware of an ongoing transmission on the link, the AP may assess if the transmission was started during the blindness period. If so, the AP may wait until the transmission concludes before sending the requested packet or frame to provide assisted blindness recovery. The AP may send this requested frame in several ways.

For example, The AP may prioritize the transmission of the blindness recovery frame to allow the requesting STA to contend for the media with the other STAs using the link.

The AP may wait for a defined period of time (e.g. 2 times the typical channel access time) before sending the requested blindness recovery frame. This would allow STAs currently using the media to continue to contend for the media and would allow the requesting STA to recover or synchronize based on the next transmitted packet one of these STAs sends. Therefore, while the recovering STA does recover after the next transmitted frame, it may need to wait until the transmitted frame has been transmitted before it can begin to contend for the media, thereby being restricted from contend for the media with the other STAs for the first transmission after its blindness. If another STA sends a frame during the defined period of time, the AP may not send the requested blindness recovery frame, as the requesting STA should have received the request by receiving the transmitted frame.

The AP may monitor the link and assess the link traffic to decide if it should or should not send the requested blindness recovery frame. For example, if the link has light traffic, it may be likely that the requesting STA would have to wait a long time for a frame to be transmitted so that it could recover, and the AP may immediately send the requested blindness recovery frame. If the link has dense traffic, it may be likely that the requesting STA will not have to wait for very long to receive a transmitted frame, hence the AP may not send the requested blindness recovery frame as the current traffic on the link will allow the STA to recover quickly.

Non-triggered AP Assisted Blindness Recovery Protocols are described herein.

An AP MLD may provide assisted blindness recovery based on its knowledge of the traffic on its links and the NSTR link status of its associated non-AP MLDs. An AP MLD may infer from the traffic to and from an NSTR non-AP MLD and the traffic on all of its links that an associated STA of the NSTR non-AP MLD is blind and has potentially lost synchronization on a link. When the AP MLD makes such an assessment, the AP MLD may transmit a blindness recovery frame using any of the above methods.

Figure 14:
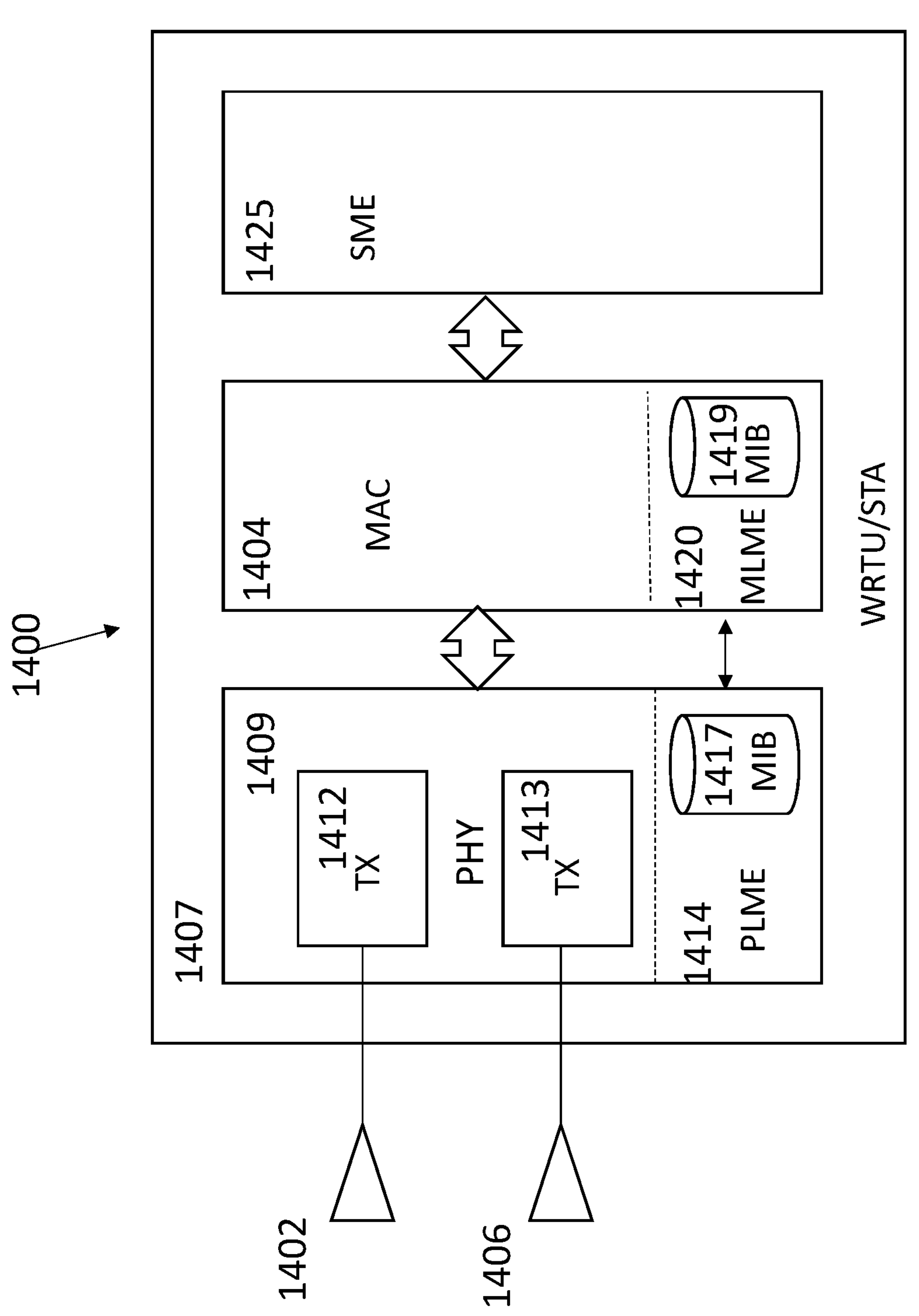
FIG. 14 is a block diagram illustrating components of a station (STA) according to embodiments disclosed herein.

FIG. 14 is a high level block diagram of a WRTU (STA) 1400 (also shown in FIG. 1B at 102) configured according to embodiments to perform the procedures, methods and actions described herein. STA 1400 comprises a cooperative arrangement of physical devices (PHY) 1409 including at least one transceiver 1412, 1413 and at least one corresponding antenna 1402, 1406. The at least one transceiver 1412, 1413 is configured to access a wireless communication medium via the least one corresponding antenna 1402, 1406 to send to and receive from other WRTU, including WRTU comprising access points (AP), wireless signals comprising frames. The other WRTU can be one or more other STA and/or one or more wireless access point (AP)(not shown). An AP can provide a wired connection to the Internet (not shown) as well as providing one or more enhanced broadcast services EBCS via one or more downlinks to STA 102, 1400.

STA 102, 1400 further comprises a medium access controller (MAC) component 1404 (also shown in FIG. 1B at 118) configured to control at least one transceiver 120, 1412, 1413 to access the wireless medium in accordance with medium access control procedures and protocols, which can be procedures and protocols specified by any one or more 802.11 standards. STA 1400 further comprises a STA service controller 1425 (also referred to as service management entity (SME), component shown in FIG. 1B at 118) for operating the STA 102, 1400 in accordance with various service related parameters. In some embodiments one or more of the parameters are stored in one or more management information databases (MIB), e.g., PLME MIB 1417 and MLME (MAC Layer Management Entity) MIB 1419. PHY 1409 can include a physical layer management controller 1414 (also referred to as a physical layer management entity PLME) which, along with MIB 1417 interfaces PHY 1409 and service controller (SME) 1425.

According to embodiments, transceiver 120, 1412, 1413 is configured to access the wireless transmission medium to transmit and receive frames. For example, medium access controller 1404 is configured to control transceiver 120, 1412, 1413 to transmit an EBCS request frame 960 according to an MLMS-EBCS.request primitive 955 received from service controller (SME) 1425 and to send an MLME- EBCS.confirm primitive 970 to service controller (SME) 1425 in response to the transceiver 120, 1412, 1413 receiving an EBCS response frame 975.

Service controller (SME) 1425 is configured to send the MLME-EBCS.request primitive 955 to the medium access controller component 1404 and to receive the MLME-EBCS.confirm primitive 970 from the medium access controller component 1404. Thereafter, service controller 1425 (SME) controls the STA 102, 1400 in accordance with EBCS parameters (730) received in the response frame 975. Specifically the service controller 1425 controls the STA 1400 to consume the requested EBCS in accordance with the EBCS parameters.

Although the features and elements of the present invention are described in the preferred embodiments in particular combinations, each feature or element can be used alone without the other features and elements of the preferred embodiments or in various combinations with or without other features and elements of the present invention. Further, although the solutions described herein consider 802.11 specific protocols, it is understood that the solutions described herein are not restricted to this scenario and are applicable to other wireless systems as well. Additionally, although SIFS is used to indicate various inter frame spacing in the examples of the designs and procedures, all other inter frame spacing such as RIFS, AIFS, DIFS or other agreed time interval could be applied in the same solutions. Similarly, although four RBs per triggered TXOP are shown in some figures as example, the actual number of RBs/channels/bandwidth utilized may vary.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a station (STA), the method comprising:

receiving, from an access point (AP), an enhanced broadcast service (EBCS) traffic stream;

receiving, from the AP, an EBCS termination notice frame including an EBCS termination information set field indicating a time at which the EBCS traffic stream will be terminated;

generating, in response to the receiving the EBCS termination notice frame, by a medium access controller, an MLME-EBCS.indication primitive including the EBCS termination information set field;

generating, when the STA desires to negotiate with the AP regarding the time at which the EBCS traffic stream will be terminated, an MLME-EBCS.request primitive including a peer STA address field, a first dialog token field, and an EBCS request element indicating a time at which the STA desires the EBCS traffic stream will be terminated;

transmitting, to the AP, in response to the MLME-EBCS-.request primitive, an EBCS request frame including an indication of the time at which the STA desires the EBCS traffic stream will be terminated;

receiving, from the AP, an EBCS response frame including a response to the EBCS request frame;

generating, in response to the received EBCS response frame, an MLME EBCS.confirm primitive based on received EBCS response frame, including a second dialog token field matching the first dialog token field, and an EBCS response element indicating a negotiated time at which the EBCS traffic stream will be terminated; and based on the received EBCS response frame, continuing to receive the EBCS traffic stream until the negotiated time at which the EBCS traffic stream will be terminated.

2. The method of claim 1, wherein a station management controller of the STA determines the time at which the STA desires the EBCS traffic stream will be terminated.

3. The method of claim 1, wherein the EBCS response frame indicates acceptance of the time at which the STA desires the EBCS traffic stream will be terminated, and wherein the EBCS response frame further includes at least one requested scheduling parameter.

4. The method of claim 3, wherein the at least one requested scheduling parameter is one of: a time-to-termination parameter, a service period parameter, or a frequency of EBCS service period parameter.

5. The method of claim 1, wherein the EBCS response frame indicates rejection of the time at which the STA desires the EBCS traffic stream will be terminated, and wherein the EBCS response frame further includes an indication of a reason for rejection.

6. The method of claim 5, wherein the reason for rejection is that the request cannot be supported by the AP.

7. A station (STA) comprising:

a receiver configured to receive, from an access point (AP), an enhanced broadcast service (EBCS) traffic stream;

the receiver further configured to receive, from the AP, an EBCS termination notice frame including an EBCS termination information set field indicating a time at which the EBCS traffic stream will be terminated;

a processor configured to generate, in response to the receiving the EBCS termination notice frame, an MLME-EBCS.indication primitive including the EBCS termination information set field;

the processor further configured to generate, when the STA desires to negotiate with the AP regarding the time at which the EBCS traffic stream will be terminated, an MLME-EBCS.request primitive including a peer STA address field, a first dialog token field, and an EBCS request element indicating a time at which the STA desires the EBCS traffic stream will be terminated;

a transmitter configured to transmit, to the AP, in response to the MLME-EBCS.request primitive, an EBCS request frame including an indication of the time at which the STA desires the EBCS traffic stream will be terminated;

the receiver further configured to receive, from the AP, an EBCS response frame including a response to the EBCS request frame;

the processor further configured to generate, in response to the received EBCS response frame, an MLME EBCS.confirm primitive based on received EBCS response frame, including a second dialog token field matching the first dialog token field, and an EBCS response element indicating a negotiated time at which the EBCS traffic stream will be terminated; and the receiver further configured to receive, based on the received EBCS response frame, the EBCS traffic stream until the negotiated time at which the EBCS traffic stream will be terminated.

8. The STA of claim 7, wherein the processor is further configured to operate a station management controller, and the station management controller determines the time at which the STA desires the EBCS traffic stream will be terminated.

9. The STA of claim 7, wherein the EBCS response frame indicates acceptance of the time at which the STA desires the EBCS traffic stream will be terminated, and wherein the EBCS response frame further includes at least one requested scheduling parameter.

10. The STA of claim 9, wherein the at least one requested scheduling parameter is one of: a time-to termination parameter, a service period parameter, or a frequency of EBCS service period parameter.

11. The STA of claim 7, wherein the EBCS response frame indicates rejection of the time at which the STA desires the EBCS traffic stream will be terminated, and wherein the EBCS response frame further includes an indication of a reason for rejection.

12. The STA of claim 11, wherein the reason for rejection is that the request cannot be supported by the AP.

* * * * *